US011079599B1

(12) United States Patent
Wheelwright et al.

(10) Patent No.: US 11,079,599 B1
(45) Date of Patent: Aug. 3, 2021

(54) HEAD-MOUNTED DISPLAY DEVICE WITH A FLIP-UP DISPLAY

(71) Applicant: FACEBOOK TECHNOLOGIES, LLC, Menlo Park, CA (US)

(72) Inventors: Brian Wheelwright, Sammamish, WA (US); Jacques Gollier, Sammamish, WA (US); Ying Geng, Bellevue, WA (US); Yusufu Njoni Bamaxam Sulai, Snohomish, WA (US); Weichuan Gao, Redmond, WA (US); Kieran Connor Kelly, Seattle, WA (US); Stephen Choi, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 54 days.

(21) Appl. No.: 16/425,818

(22) Filed: May 29, 2019

(51) Int. Cl.
*G02B 27/01* (2006.01)
*G02B 27/09* (2006.01)

(52) U.S. Cl.
CPC ..... *G02B 27/0176* (2013.01); *G02B 27/0983* (2013.01); *G02B 2027/0154* (2013.01); *G02B 2027/0178* (2013.01)

(58) Field of Classification Search
CPC ............ G02B 27/0176; G02B 27/0983; G02B 2027/0154; G02B 2027/0178
See application file for complete search history.

(56) References Cited

U.S. PATENT DOCUMENTS

| 9,632,312 | B1* | 4/2017 | Cakmakci | G02B 5/1852 |
| 2005/0264502 | A1* | 12/2005 | Sprague | G02B 5/10 345/84 |
| 2016/0216517 | A1* | 7/2016 | Border | G02B 5/30 |
| 2016/0320623 | A1* | 11/2016 | Miyao | H04N 13/344 |
| 2016/0377867 | A1* | 12/2016 | Kessler | G02B 5/3083 359/482 |
| 2019/0086675 | A1* | 3/2019 | Carollo | G02B 27/0955 |

* cited by examiner

*Primary Examiner* — Temesghen Ghebretinsae
*Assistant Examiner* — Sosina Abebe
(74) *Attorney, Agent, or Firm* — Morgan, Lewis & Bockius LLP

(57) ABSTRACT

A display device includes a frame, a display, an optical assembly, and a display-moving assembly connected to the display and the frame. The display-moving assembly is configured to move the display between multiple different positions, including a first position and a second position. When the display is in the first position, the display is configured to output image light in a first direction. The first direction is substantially parallel to an optical axis of the optical assembly. When the display is in the second position, the display is positioned away from the optical axis of the optical assembly.

19 Claims, 17 Drawing Sheets

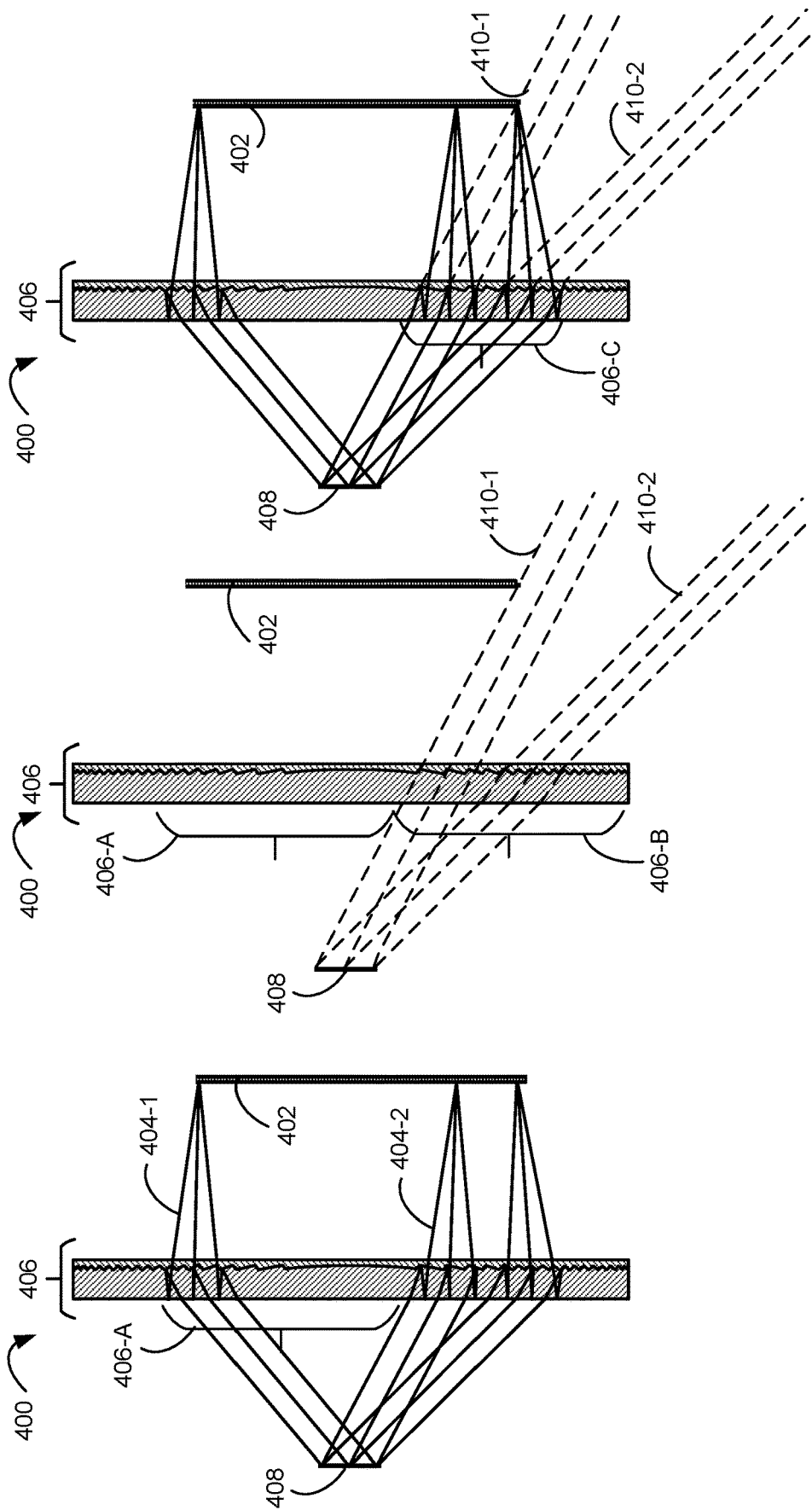

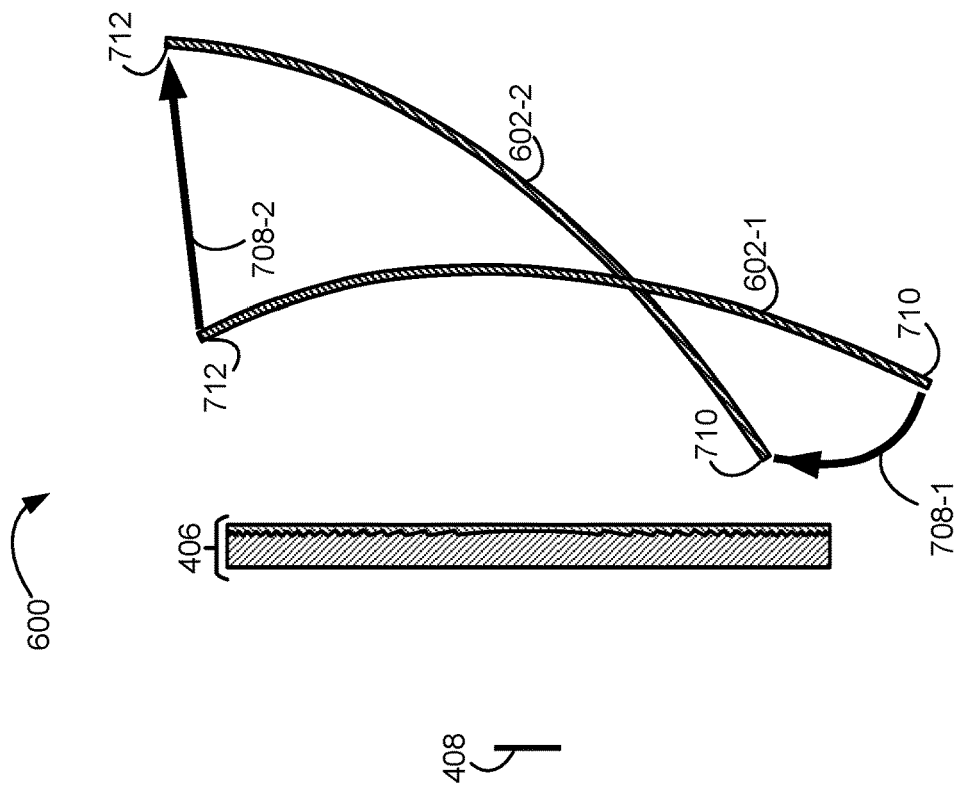
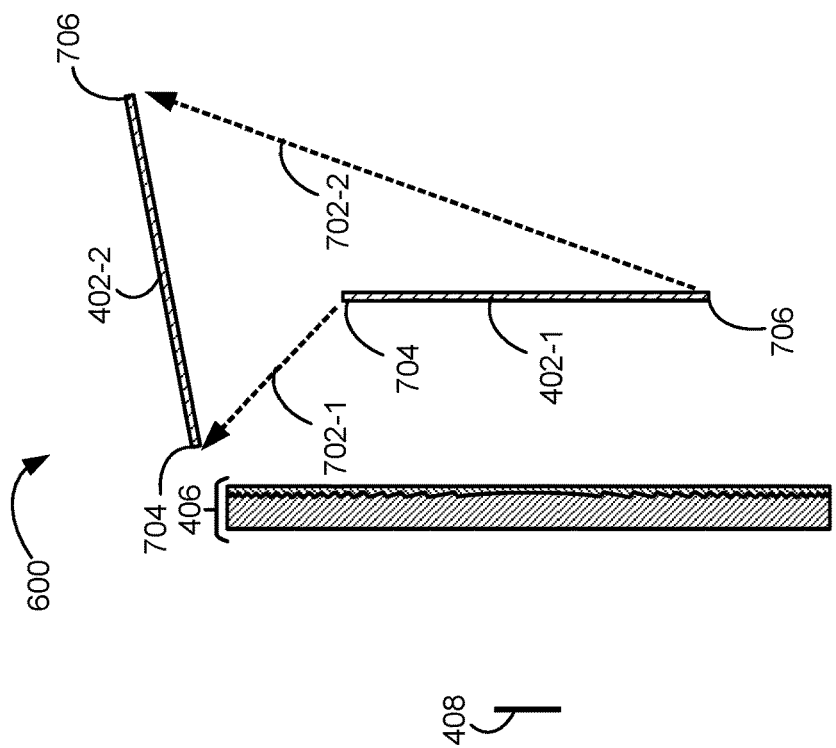
Figure 7C
Figure 7B

HEAD-MOUNTED DISPLAY DEVICE WITH A FLIP-UP DISPLAY

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality, mixed reality, and augmented reality operations.

When using head-mounted display devices, it can be desirable for a user to selectively operate the display device in a variety of modes to suit the user's current needs. For example, it might desirable to switch between viewing mixed reality content and augmented reality content, or to switch between viewing mixed reality content and the real world. Additionally, it may be desirable for a user to have a partial view of the external environment while viewing virtual, augmented, and/or mixed reality content. Currently available display devices do not offer users the capability of switching between various modes that can be suited to the user's different needs.

SUMMARY

Accordingly, there is a need for a head-mounted display device that is switchable (either manually or automatically) between different display modes (e.g., a display mode that allows the user to view mixed content, a see-through mode where the user may view the outside environment without removing or turning off the head-mounted display, among others). In accordance with some embodiments, a display device includes a frame, a display, an optical assembly, and a display-moving assembly connected to the display and the frame. The display-moving assembly is configured to move the display between multiple different positions, including a first position and a second position. When the display is in the first position, the display is configured to output image light in a first direction. The first direction is substantially parallel to an optical axis of the optical assembly. When the display is in the second position, the display is positioned away from the optical axis of the optical assembly.

In accordance with some embodiments, a method performed at a display device including a display, an optical assembly, and a display-moving assembly include moving, with the display-moving assembly connected to the display and the frame, the display to a first position. In response to moving the display to the first position, outputting, by the display, image light in a first direction. The first direction is substantially parallel to an optical axis of the optical assembly. The method also includes moving, with the display-moving assembly connected to the display and the frame, the display from the first position to a second position different from the first position. The display is positioned away from the optical axis of the optical assembly when in the second position.

Thus, the disclosed embodiments provide a display device capable of switching between an opaque mode and a see-through mode to selectively allow external or ambient light to enter the eyes of a user.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 4A-4D are schematic diagrams illustrating a display device and its various viewing functionalities in accordance with some embodiments.

FIGS. 7A-7C are schematic diagrams illustrating transferring between the mixed reality and augmented reality modes in the display device of FIGS. 6A-6B in accordance with some embodiments.

Figure 1:
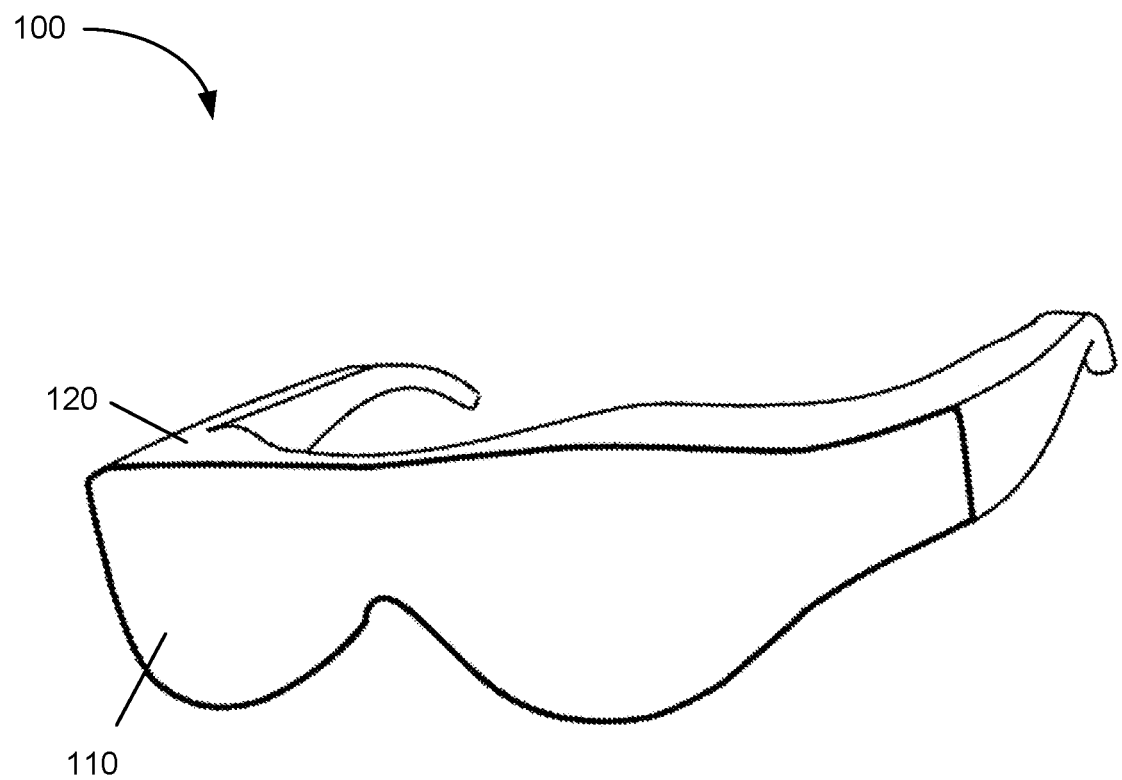
FIG. 1 is a perspective view of a display device in accordance with some embodiments.

These figures are not drawn to scale unless indicated otherwise.

DETAILED DESCRIPTION

The present disclosure provides a head-mounted display device (or display device) having a flip-up display that is movable between multiple positions, including a first and a second position. In the first position, the display is disposed in front of an eye of a user and is configured to provide mixed and/or augmented reality content to the eye of the user. In the second position, the display is flipped up such that the user may view the outside environment without removing or turning off the head-mounted display. Additionally, the head-mounted display device, when the display is in the second position, can provide augmented reality content to the eye of the user. In some embodiments, the head-mounted display device includes an optical combiner that reflects light from the display toward the eye of the user while also transmitting ambient light from the outside environment to the eye of the user.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first hinge could be termed a second hinge, and, similarly, a second hinge could be termed a first hinge, without departing from the scope of the various described embodiments. The hinge and the hinge are both hinges, but they are not the same hinge.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a perspective view of display device 100 in accordance with some embodiments. In some embodiments, display device 100 is configured to be worn on a head of a user (e.g., by having the form of spectacles or eyeglasses or goggles, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 can be mounted in a vehicle, such as a car or an airplane, for placement in front of an eye or eyes of the user). As shown in FIG. 1, display device 100 includes display 110 coupled with frame 120. Display 110 is configured for presenting visual content (e.g., augmented reality content, virtual reality content, mixed reality content, or any combination thereof) to a user. In some instances, display 110 is called a flip up display 110.

Figure 2:
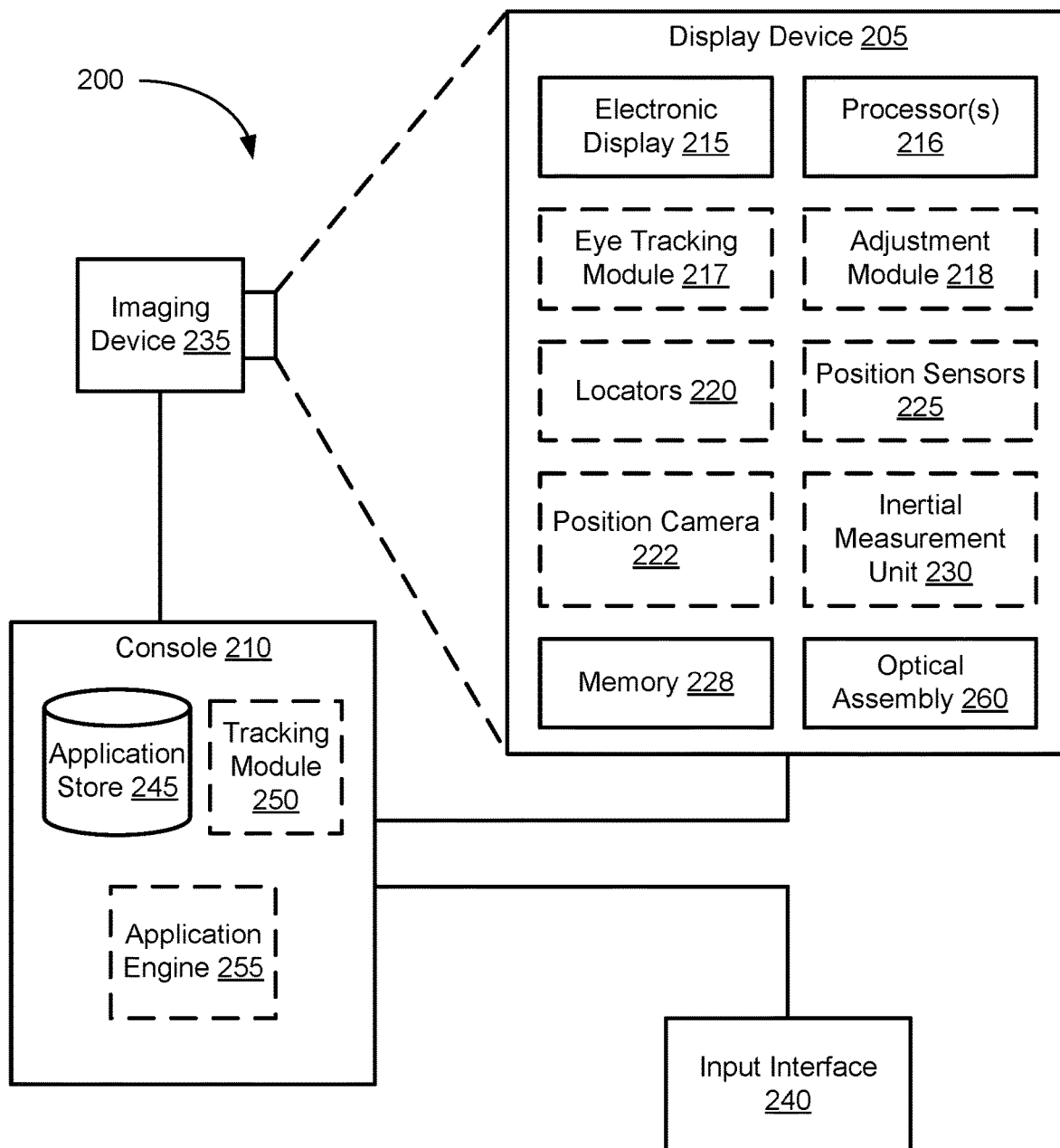
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240, which are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and/or mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operates as a virtual reality device, as an augmented reality device, as glasses, or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory device; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, adjustment module 218 sends a discrete image to the display that will tile sub-images together such that a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough not to substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion and/or position, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; in practice, however, the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 can be configured to detect light emitted or reflected from locators 220 in a field-of-view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, moving images, and/or a combination thereof. The computer-generated images include objects that appear to be two-dimensional and/or three-dimensional objects.

In some embodiments, electronic display 215 projects computer-generated images to one or more reflective elements (e.g., partial reflector 602 described with respect to FIG. 6B), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that, when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in its determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
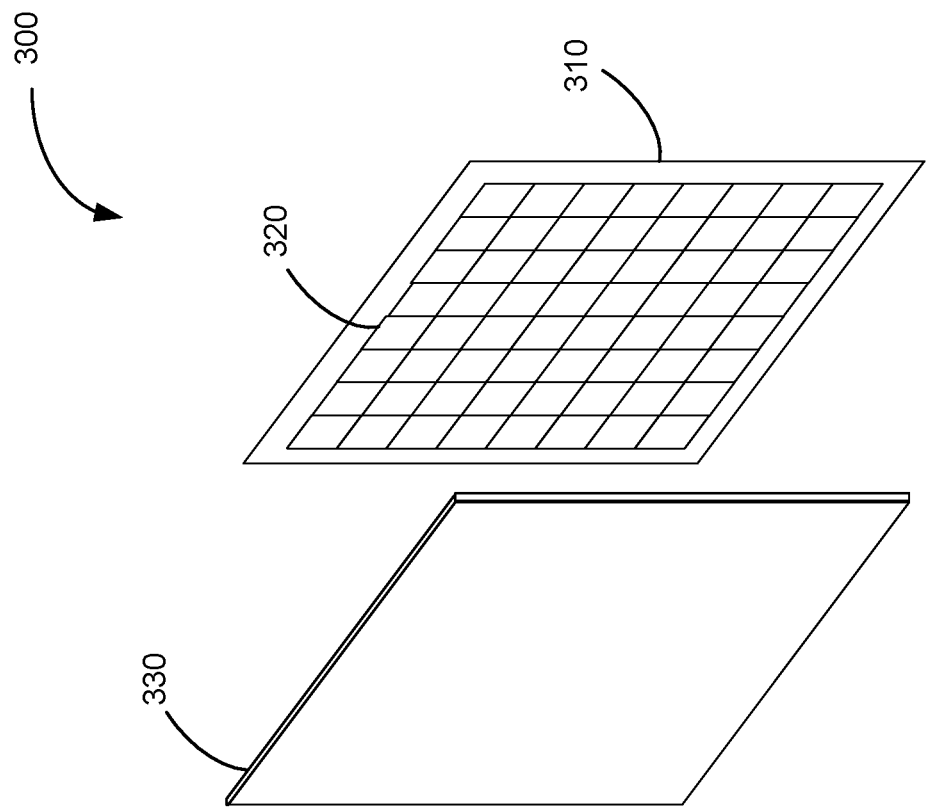
FIG. 3 is an isometric view of a display device in accordance with some embodiments.
Figure 3:
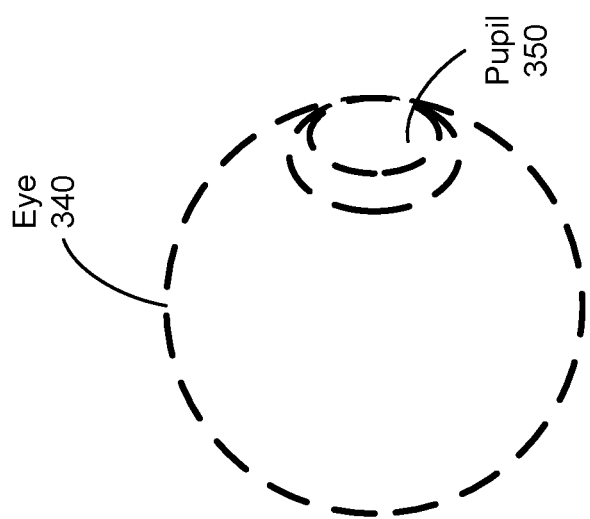

FIG. 3 is an isometric view of a display device 300, which corresponds to part of or all of display device 100 (FIG. 1) in accordance with some embodiments. In some embodiments, display device 300 includes an emitting surface 310 (e.g., a light emission device array or reflective element) and an optical assembly (e.g., optical assembly 260) having one or more optical components 330 (e.g., lenses).

In some embodiments, light emission device array 310 emits image light toward the optical components 330. Light emission device array 310 may be, e.g., an array of LEDs, an array of microLEDs, an array of OLEDs, or some combination thereof. Light emission device array 310 includes light emission devices 320 that emit light in the visible light.

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330. In some embodiments, display device 300 uses an emission intensity array to facilitate providing image light to a location of pupil 350 of eye 340 of a user and to minimize the amount of image light provided to other areas in the eyebox.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, in response to a determined location of pupil 350, the display element adjusts the emitted image light such that the light output by the display element is refracted by one or more optical components 330 toward the determined location of pupil 350, and not toward another presumed location.

In some embodiments, display device 300 includes one or more broadband sources (e.g., one or more white LEDs) coupled with a plurality of color filters, in addition to, or instead of, light emission device array 310.

One or more optical components 330 receive the image light (or modified image light, e.g., attenuated light) from emission surface 310, and direct the image light to a detected or presumed location of the pupil 350 of an eye 340 of a user.

In some embodiments, the one or more optical components include one or more optical assemblies 260.

FIGS. 4A-4D are schematic diagrams illustrating display device 400 and its various viewing functionalities in accordance with some embodiments. Display device 400 includes display 402, optical assembly 406, and a frame (e.g., frame 120 described with respect to FIG. 1). Display device 400 in configured to provide mixed reality content to a user. In some embodiments, display device 400 is a head-mounted display device (e.g., display device 100 described with respect to FIG. 1).

In some embodiments, display 402 corresponds to light emission device array 310 described with respect to FIG. 3. As shown, display 402 includes emitting surface 402-A and opaque surface 402-B. Display 402 is configured to output image light 404 (e.g., image light 404 including rays 404-1 and 404-2) from emitting surface 402-A through optical assembly 406 toward reference pupil 408. Image light 404 corresponds to one or more images (e.g., computer-generated virtual reality images). In some embodiments, reference pupil 408 corresponds to a pupil of an eye of a user of display device 400 (e.g., pupil 350 of eye 340 shown in FIG. 3).

Figure 4A:
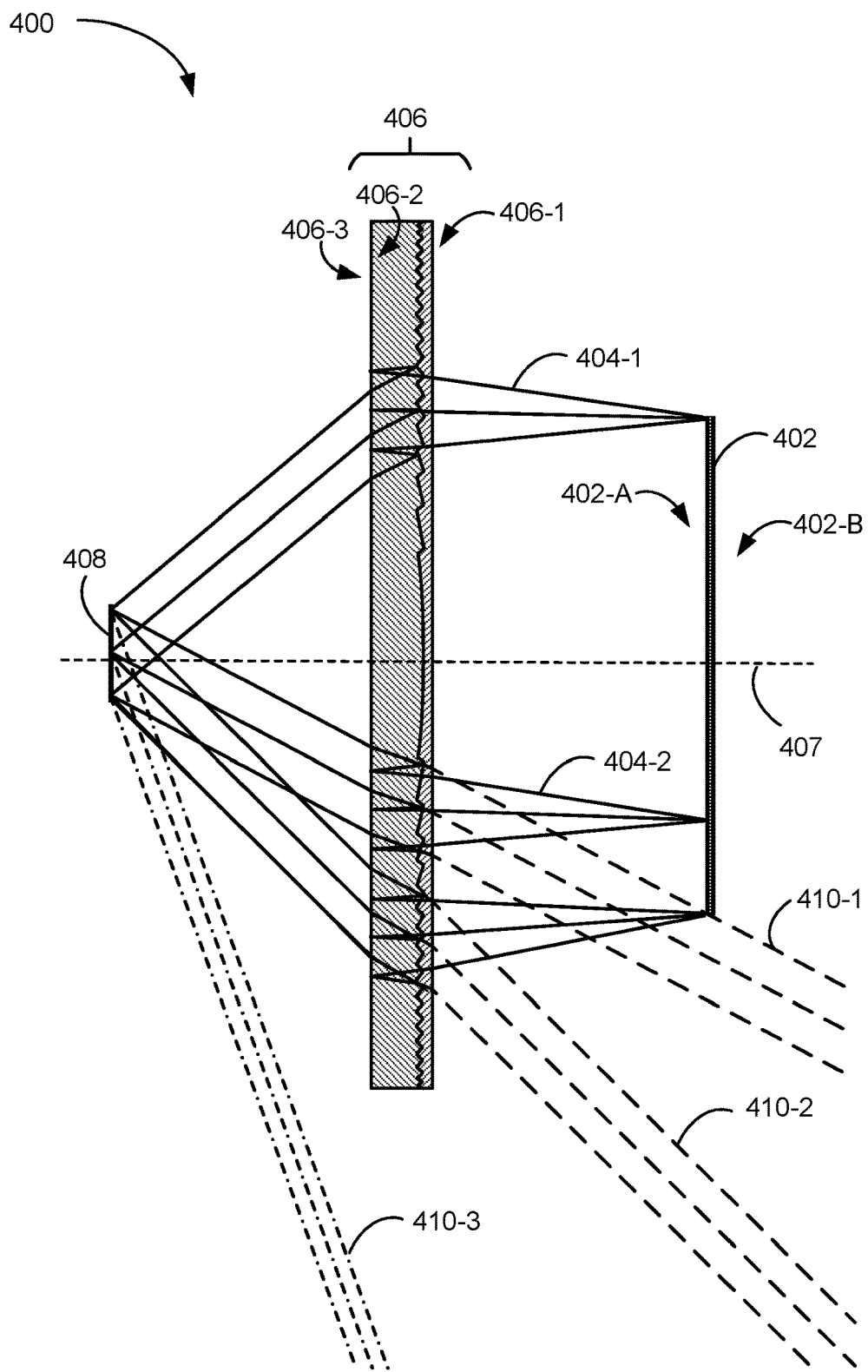

As shown, optical assembly 406 is disposed between display 402 and reference pupil 408 such that optical axis 407 of optical assembly 406 is substantially the same as an optical axis of display 402. Optical assembly 406 is configured to receive image light 404 (e.g., by first region 406-1 of optical assembly shown in FIG. 4B) output by display 402 and redirect image light 404 toward reference pupil 408. Optical assembly 406 is further configured to receive ambient light 410 (e.g., ambient light 410 including rays 410-1 and 410-2) (e.g., by second region 404-2 shown in FIG. 4C) from an outside of display device 400 and transmit ambient light 410 toward reference pupil 408. In some embodiments, optical assembly 406 is a pancake lens including partial reflector 406-1, retarder plate 406-2, and reflective polarizer 406-3 that provides either a folded or a direct (un-folded) optical path, depending on the polarization of light. As shown, image light 404 having a circular polarization has a folded optical path and a portion of unpolarized ambient light, indicated as light 410, has a direct optical path as the lights propagate through optical assembly 406. In some embodiments, partial reflector 406-1, retarder plate 406-2, and reflective polarizer 406-3 are stacked together forming a single optical element. In some embodiments, partial reflector 406-1, retarder plate 406-2, and reflective polarizer 406-3 are thin films coated on and/or embedded into two or more optically transparent substrates stacked together. In some embodiments, the single optical element is a flat optical element, as shown in FIG. 4A. In some embodiments, optical assembly 406 includes a Fresnel structured surface. For example, as shown in FIG. 4A, optical assembly 406 includes a substrate having a Fresnel structure coated with partial reflector 406-1.

In some embodiments, display device 400 is also configured to allow additional ambient light (e.g., rays 410-3) from areas outside display 402 to enter reference pupil 408 without being transmitted through optical assembly 406. For example, a user may wish to have a partial view of the surrounding environment while viewing content output by display 402. Display device 400 allows ambient light to enter the eye of the user. For example, a user may look down to see the ground to enable moving around safely.

FIGS. 4B-4C provide more detailed illustration of functions of display device 400. FIG. 4B shows first region 406-A of optical assembly 406 configured to receive image light 404 (e.g., rays 404-1 and 404-2) output by display 402 and to transmit image light 404 toward reference pupil 408. For example, first region 406-A is a region of optical assembly 406 corresponding to an angular space defined by image light 404. First region 406-A does not receive other light, as ambient light directed to this region is blocked by display 402 (e.g., opaque surface 402-B of display 402). A user of display device 400 will therefore see virtual reality content (e.g., computer-generated images corresponding to image light 404 output by display 402) in an area of user's field-of-view corresponding to first region 406-A.

FIG. 4C shows second region 406-B of optical assembly 406 configured to receive ambient light 410 (e.g., rays 410-1) from the outside of display device 400. For example, second region 406-B is a region of optical assembly 406 corresponding to an angular space defined by ambient light 410 transmitted through optical assembly. Second region 406-B is distinct from first region 406-A and adjacent to first region 406-A. In some embodiments, second region 406-B corresponds to a less than 50% of an area of the optical assembly 406 (e.g., an area corresponding to approximately 10%, 20%, 30%, or 40% of optical assembly 406). In some embodiments, second region 406-B corresponds to a lower portion of optical assembly 406, as shown in FIG. 4C. In some embodiments, second region 406-B corresponds to a peripheral region of optical assembly 406 such that second region 406-B surrounds first region 406-A fully or partially. A user of display device 400 will see a real world view in an area of user's field-of-view corresponding to second region 406-B.

FIG. 4D shows third region 406-C of optical assembly 406 overlapping partially first region 406-A and overlapping partially second region 406-B of optical assembly 406. For example, third region 406-C is a region of optical assembly 406 corresponding to an angular space defined by image light 404 overlapping with ambient light 410. Third region 406-C is configured to receive both image light 404 output by display 402 and ambient light 410 from the outside of display device 400. Third region 406-C of optical assembly 406 is configured to combine image light 404 (e.g., rays 404-2) and ambient light (e.g., rays 410-1 and 410-2) such that images corresponding to image light 404 are perceived by the user together with ambient light 410. A user of display device 400 will therefore see (i.e., perceive) augmented reality or mixed reality in an area of the user's field of view corresponding to third region 406-C.

Figure 5B:
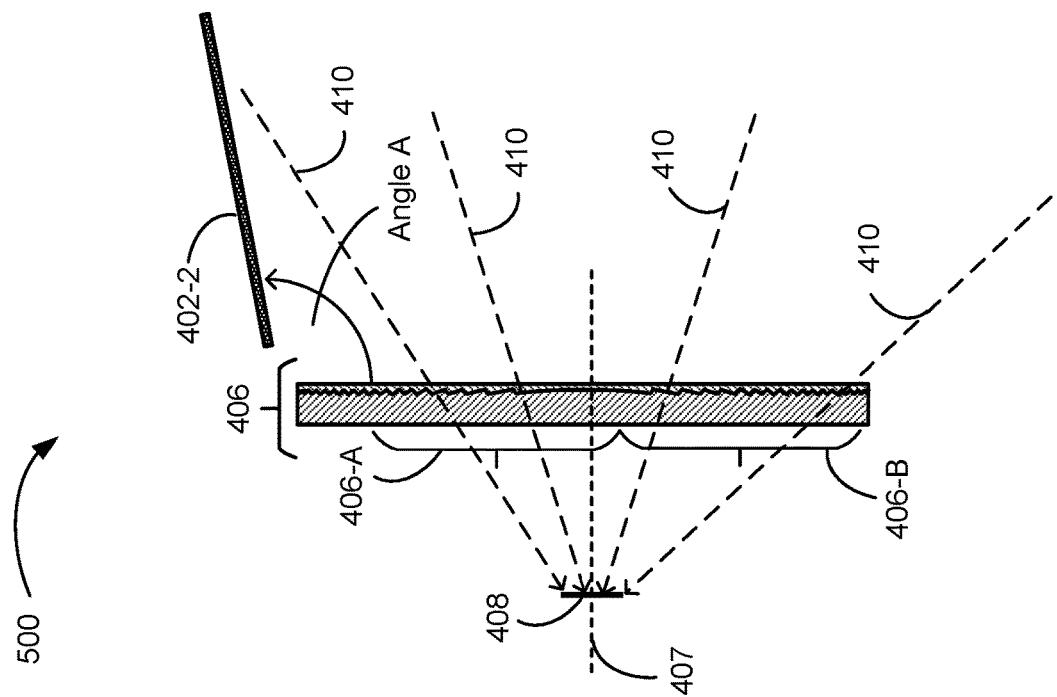
FIGS. 5A-5C are schematic diagrams illustrating a display device in accordance with some embodiments.
Figure 5A:
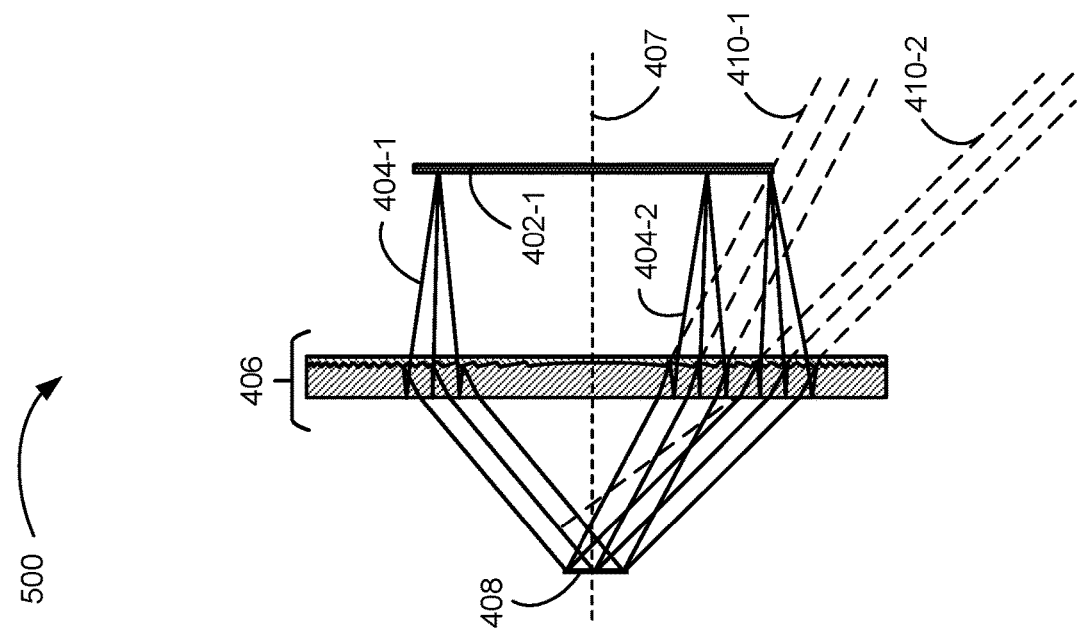
Figure 5C:
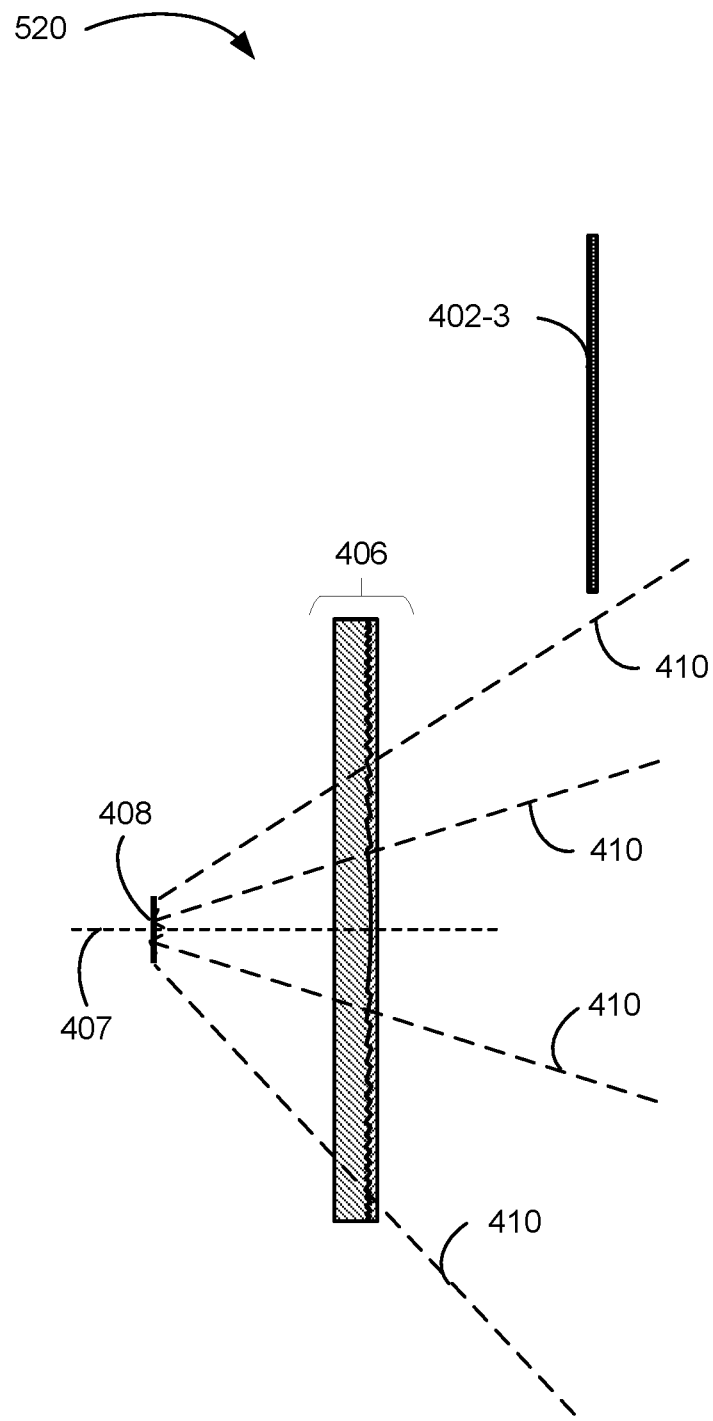

FIGS. 5A-5C are schematic diagrams illustrating display device 500 in accordance with some embodiments. Display device 500 corresponds to display device 400 described with respect to FIG. 4A, except that display device 500 includes display 402 that is movable (or transferrable) between different positions. In FIG. 5A, display 402 is in a first position, indicated as display 402-1 and in FIG. 5B display 402 is moved (e.g., flipped up or turned) to a second position indicated as display 402-2. As shown in FIG. 5A, in the first position corresponding to a mixed reality mode (e.g., described above with respect to FIGS. 4A-4D), display 402 is configured to output image light 404 (e.g., rays 404-1 and 404-2) in a direction substantially parallel to optical axis 407 of optical assembly 406 (e.g., display 402-1 and optical assembly 406 have substantially parallel optical axes). As shown in FIG. 5B, in the second position, display 402 is moved away from optical axis 407 of optical assembly 406 by a distance. In some embodiments, display 402 is positioned such that display 402 in the second position and optical assembly 406 define angle A. In some embodiments, angle A is at least 75 degrees (e.g., angle A is at least 75, at least 80, at least 85, at least 90, at least 95, or at least 100 degrees). In some embodiments, angle A is at least 90 degrees, as shown. In some embodiments, display 402 in the second position is disposed away from user's field of view, such that display 402-2 does not generally prevent ambient light 410 from the outside of display device 500 from entering reference pupil 408. In FIG. 5B, both of first region 406-A and second region 406-B of optical assembly 406 are configured to receive ambient light 410 and transmit ambient light 410 toward reference pupil 408.

In some embodiments, display 402 in the second position is moved such that display 402 remains substantially parallel to optical assembly 406. As shown in FIG. 5C, display 402 is moved away from optical axis 407 of optical assembly 406 such that display 402 remains substantially parallel to display device optical axis 407 (e.g., display 402 is substantially perpendicular to optical axis 407), as is indicated by display 402-3. For example, display 402 has been rotated by approximately 180 degrees from the first position (e.g., display 402-1) shown in FIG. 5A. Alternatively, display 402-3 has been slid, transferred, or transitioned in some way, such that display 402-3' is moved away from optical axis 407 of optical assembly 406.

In some embodiments, display 402-3 is configured to be detached from and re-attached to display device 500. In such embodiments, display 402-3 and/or the frame of display device 500 (e.g., frame 120 in FIG. 1) includes an assembly for enabling the detachment and re-attachment of display 402-3. In some embodiments, the assembly includes a kinematic interface including magnets and/or clips that allow display 402-3 to be re-attached to its original position (e.g., the first position indicated as display 402-1 in FIG. 5A) such that optical properties of display device 500 remain constant.

In some embodiments, display 402-2 in the second position is configured to cease outputting image light 404. For example, when display 402 is moved to the second position, display 402 automatically ceases to output image light 404, in order to extend the battery life of display device 500. When display 402 is moved back to the first position, in some embodiments, display 402 automatically initiates outputting image light 404 again.

Figure 6A:
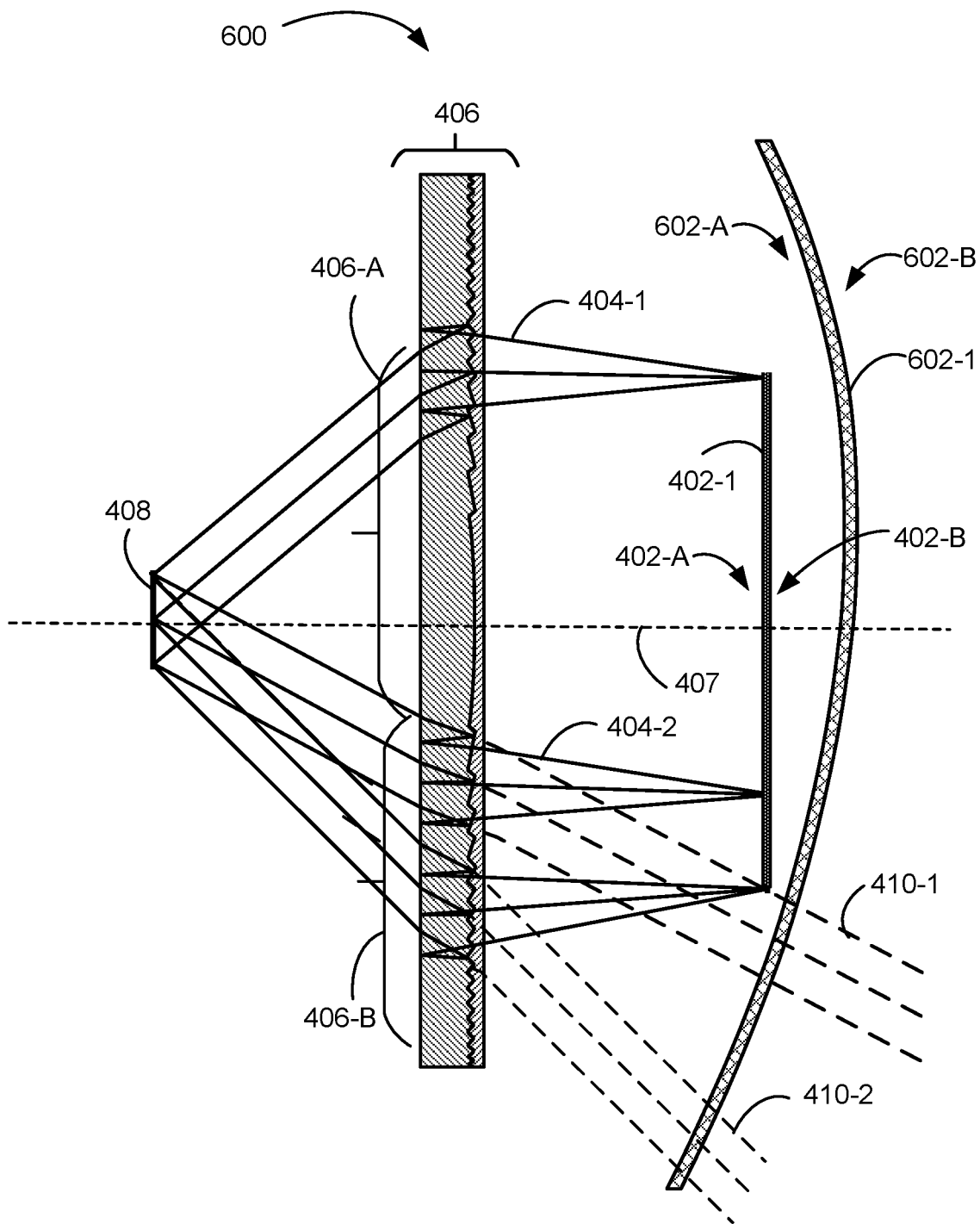
FIGS. 6A-6B are schematic diagrams illustrating a display device operable in a mixed reality mode and an augmented reality mode in accordance with some embodiments.
Figure 6B:
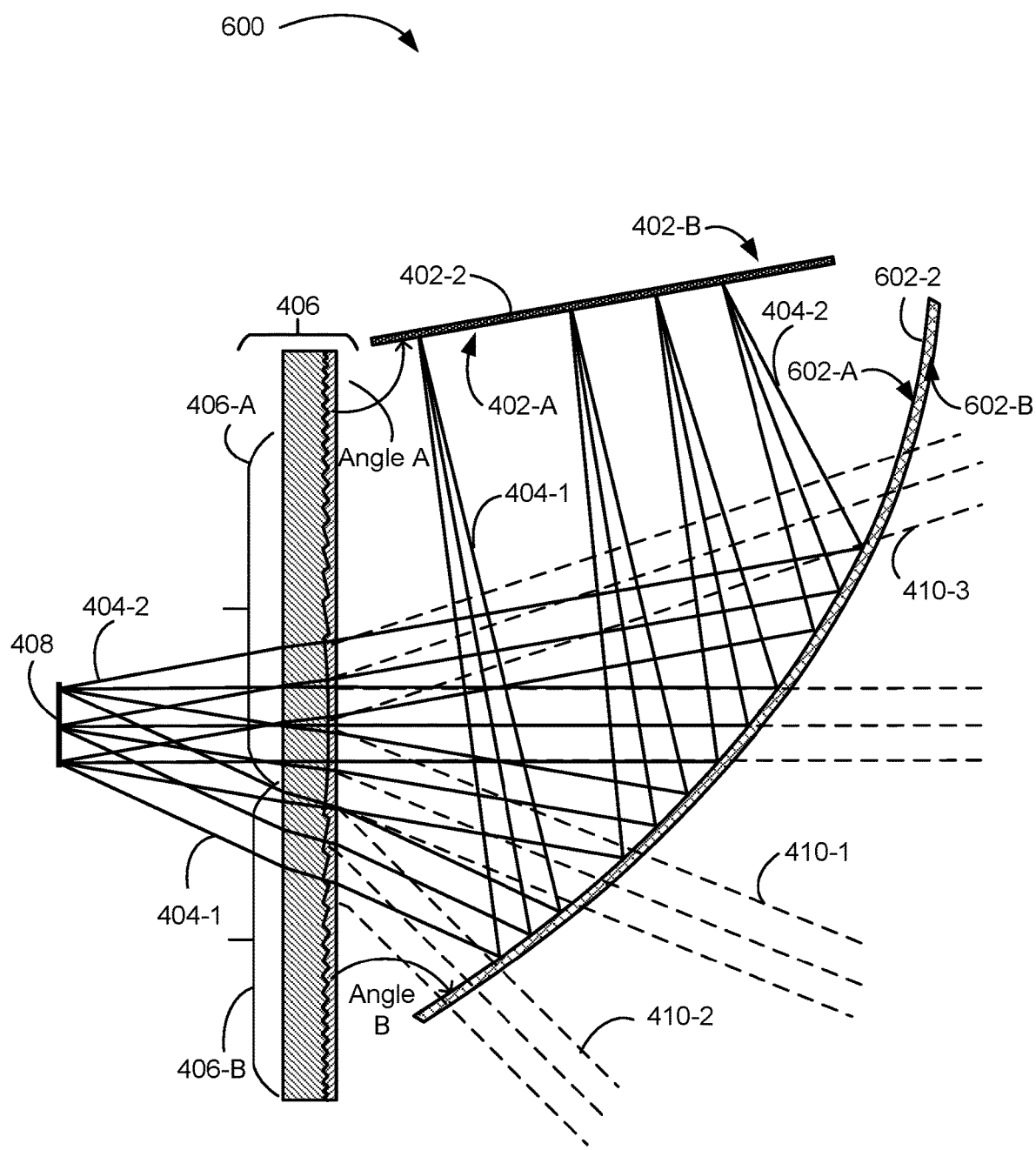

FIGS. 6A-6B are schematic diagrams illustrating display device 600 operable in a mixed reality mode (e.g., shown in FIG. 6A) and an augmented reality mode (e.g., shown in FIG. 6B) in accordance with some embodiments. Display device 600 corresponds to display device 500 described with respect to FIGS. 5A-5B, except that display device 600 further includes partial reflector 602 that is movable between different positions. Partial reflector 602 is configured to transmit a portion of the light incident thereon while transmitting a portion of the light. In some embodiments, partial reflector 602 is a 50/50 mirror. In some embodiments, partial reflector 602 includes surface 602-A facing display 402 (at least when positioned in the manner shown in FIG. 6A) and surface 602-B opposite to surface 602-A. In some embodiments, partial reflector 602 includes a plurality of embedded films including at least one partial reflector film and one or more non-reflecting films. In some embodiments, surface 602-A includes a partial reflector. In some embodiments, surface 602-B includes an absorbing or reflective polarizer configured to transmit a portion of ambient light 410 having a particular polarization while absorbing another portion of ambient light 410 having polarization distinct from the particular polarization. In some embodiments, partial reflector 602 includes one or more retarder plates (e.g., one or more of quarter-wave plates or half-wave plates).

FIG. 6A shows display device 600 in a mixed reality mode. In the mixed reality mode, display device 600 operates corresponding to display device 400 described with respect to FIGS. 4A-4D. In FIG. 6A, partial reflector 602 is in a first position indicated as partial reflector 602-1. When partial reflector 602 is in the first position, display 402 is also in the first position indicated as display 402-1. Partial reflector 602-1 is positioned on optical axis 407 of optical assembly 406, and is disposed facing opaque surface 402-B of display 402 while optical assembly 406 is disposed facing emitting surface 402-A. Partial reflector 602 is configured to transmit, at least partially, ambient light 410 (e.g., rays 410-1) toward optical assembly 406 while retaining a direction of ambient light 410 (e.g., partial reflector 602 does not change the direction of ambient light 410). In some embodiments, partial reflector 602 acts as a shield or a cover for display 402 when in the first position.

FIG. 6B shows display device 600 in an augmented reality mode. In FIG. 6B, partial reflector 602 has moved to a second position indicated as partial reflector 602-2. When partial reflector 602 is in the second position, display 402 is also in the second position indicated as display 402-2. In some embodiments, display 402 and partial reflector 602 move between their respective first and second positions concurrently. For example, display 402 is moved (e.g., pivots, rotates) from its first position to its second position concurrently as partial reflector 602 is moved from its first position to its second position. In some embodiments, movement of display 402 causes partial reflector 602 to also move (or vice versa) (i.e., both display 402 and partial reflector 602 can be moved with one hand). In some embodiments, in the second position, partial reflector defines angle B with respect to optical assembly 604. In some embodiments, angle B is at least 10 degrees (e.g., at least 10, at least 15, at least 20, at least 25, at least 30, at least 35, or at least 40 degrees).

As shown, partial reflector 602 in the second position indicated as partial reflector 602-2 is at least partially facing emitting surface 402-A of display 402. In the second position, partial reflector 602 is configured to act as an optical combiner that combines light output by display 402-2 and ambient light 410 from the outside of display device 600. Partial reflector 602 is configured to receive image light 404 (e.g., rays 404-1 and 404-2) output by display 402-2 and redirect image light 404, through optical assembly 406, toward reference pupil 608. Concurrently, partial reflector 602 is configured to transmit ambient light 410 from outside of the display device 600. Optical assembly 406 (e.g., including first region 406-A and second region 406-B) is configured to receive both of (i) image light 404 output by display 402 and redirected by partial reflector 602, and (ii) ambient light 410 from the outside of display device 600. Display device 600 therefore combines image light 404 and ambient light 410 such that images corresponding to image light 404 are perceived by the user together with ambient light 410. A user of display device 600 will therefore see augmented reality or mixed reality content. For example, the images corresponding to image light 404 are overlapping a real world view.

In some embodiments, partial reflector 602 has a curved shape, as shown in FIG. 6B. Partial reflector 602 in the second position is configured to focus image light 404 such that image light 404 reflected off partial reflector 602 is more collimated than image light 404 received by partial reflector 602. In some embodiments, image light 404 has a first divergence when incident on partial reflector 602 and has a second divergence, less than the first divergence, when reflected off partial reflector 602.

Figure 6C:
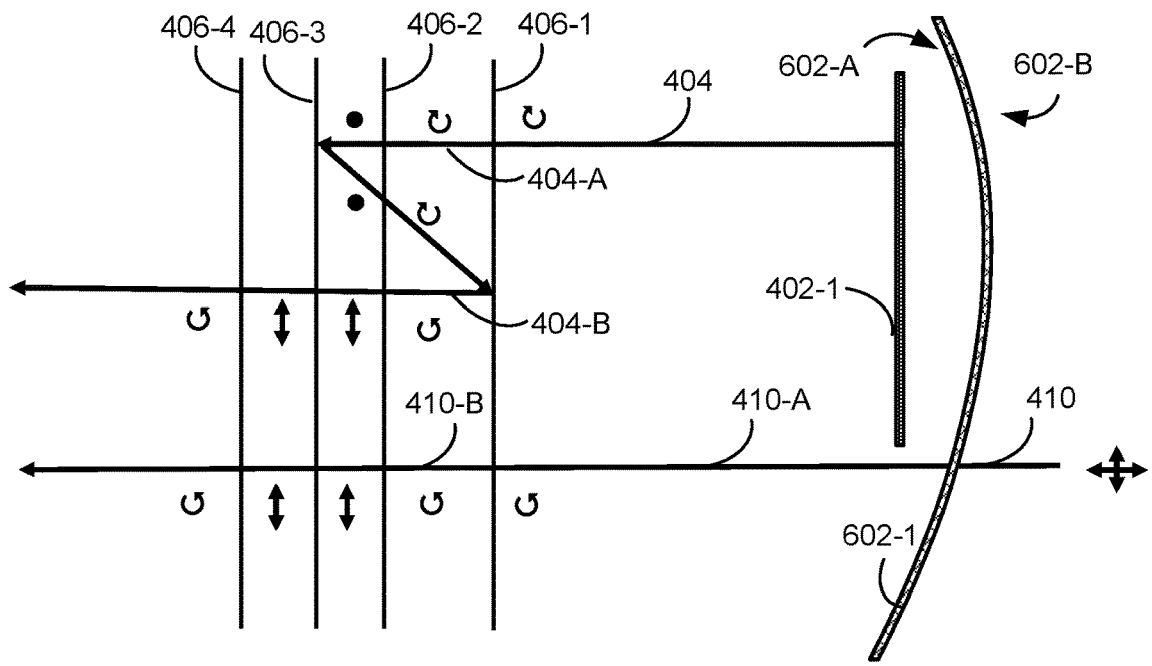
FIGS. 6C-6D illustrate polarization of light propagating in the display device of FIGS. 6A-6B in the mixed reality and augmented reality modes in accordance with some embodiments.
Figure 6D:
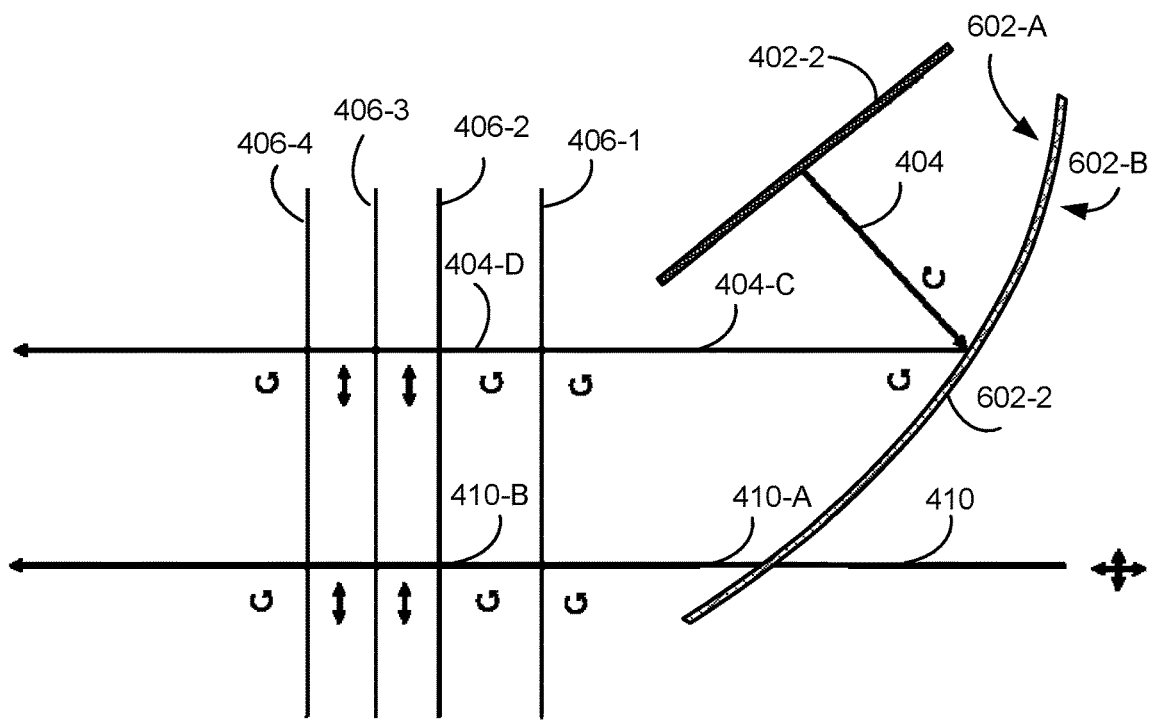

FIGS. 6C-6D illustrate polarization of light propagating in display device 600 in the mixed reality and augmented reality modes in accordance with some embodiments. Optical assembly 406 includes partial reflector 406-1, retarder plate 406-2, reflective polarizer 406-3, and optionally retarder plate 406-4. Retarder plate 406-2 is disposed between partial reflector 406-1 and reflective polarizer 406-3. Optical assembly 406 is configured to direct light (e.g., image light 404 and ambient light 410) toward reference pupil 408 through different optical paths dependent on a polarization of light. As shown above in FIG. 4A, image light 404 has a folded optical path and ambient light 410 has a direct optical path as the light rays propagate through optical assembly 406.

FIG. 6C illustrates optical paths of image light 404 and ambient light 410 in display device 600 when display 402 and partial reflector 602 are in their respective first positions. Image light 404 propagates through the folded optical path while ambient light 410 propagates through the direct (unfolded) optical path in FIG. 6C. Display 402-1 is configured to output image light 404 having a first circular polarization. Partial reflector 406-1 is configured to receive image light 404 having the first circular polarization and transmit a portion of image light 404, i.e., a first portion 404-A of image light 404. Retarder plate 406-2 (e.g., a quarter-wave plate) is configured to receive the first portion 404-A of image light 404 and convert its polarization to a first linear polarization. Reflective polarizer 406-3 is configured to receive the first portion 404-A of image light 404 having the first linear polarization and reflect it toward retarder plate 406-2 without changing its polarization. Retarder plate 406-2 is further configured to receive and transmit the first portion 404-A of image light 404 from reflective polarizer 406-3 and convert its polarization to the first circular polarization. Partial reflector 406-1 is configured to receive the first portion 404-A of image light 404 and reflect a portion of the first portion 404-A, i.e., a second portion 404-B of image light 404, while converting its polarization to second circular polarization. The second circular polarization is opposite to the first circular polarization. For example, the first circular polarization is right-handed circular polarization and the second circular polarization is left-handed circular polarization, or vice versa. Retarder plate 404-2 is configured to receive the second portion 404-B of image light 404 and transmit it while converting its polarization to a second linear polarization. The second linear polarization is orthogonal to the first linear polarization. Reflective polarizer 402-6 is configured to receive and transmit the second portion 404-B of image light 404 having the second linear polarization.

In some embodiments, surface 602-B of partial reflector 602 includes a retarder plate film combined with an absorbing or reflective linear polarizer film. Surface 602-B of partial reflector 602 is thereby configured to receive ambient light 410 and to selectively transmit a portion of ambient light 410, i.e., first portion 410-A of ambient light 410, having a particular polarization (e.g., first portion 410-A of ambient light 410 has the second circular polarization in FIG. 6D) while absorbing (blocking) ambient light 410 having a polarization distinct from the particular polarization. Partial reflector 406-1 is configured to receive first portion 410-A of ambient light 410 and transmit a portion of the first portion 410-A, i.e., a second portion 410-B of image light 410. Retarder plate 406-2 is configured to transmit the second portion 410-B of ambient light 410 while converting its polarization to the second linear polarization. Reflective polarizer 406-3 is configured to transmit the second portion 410-B of ambient light 410 without changing its polarization.

In some embodiments, optional retarder plate 406-4 is configured to further convert the polarizations of second portion 404-B of image light 404 and second portion 410-B of ambient light 410 to the second circular polarization. In some embodiments, retarder plate 406-4 further includes an antireflection coating (e.g., an anti-narcissus coating).

FIG. 6D illustrates optical paths of image light 404 and ambient light 410 in display device 600 when display 402 and partial reflector 602 are in their respective second positions. Image light 410 propagates through display device 600 via the direct optical path as described with respect to ambient light 410 in FIG. 6C. In the second position, display 402-2 is configured to output image light 404 having the first circular polarization toward partial reflector 602. Partial reflector 602-2 is configured to receive image light 404 and reflect a portion of image light 404, i.e., a third portion 404-C of image light while converting its polarization to the second circular polarization. The third portion 404-C continues to propagate through optical assembly 406 through the folded optical path, as described with respect to image light 404 in FIG. 6C, such that a fourth portion 404-D of image light 404 is directed toward reference pupil 408.

Figure 7A:
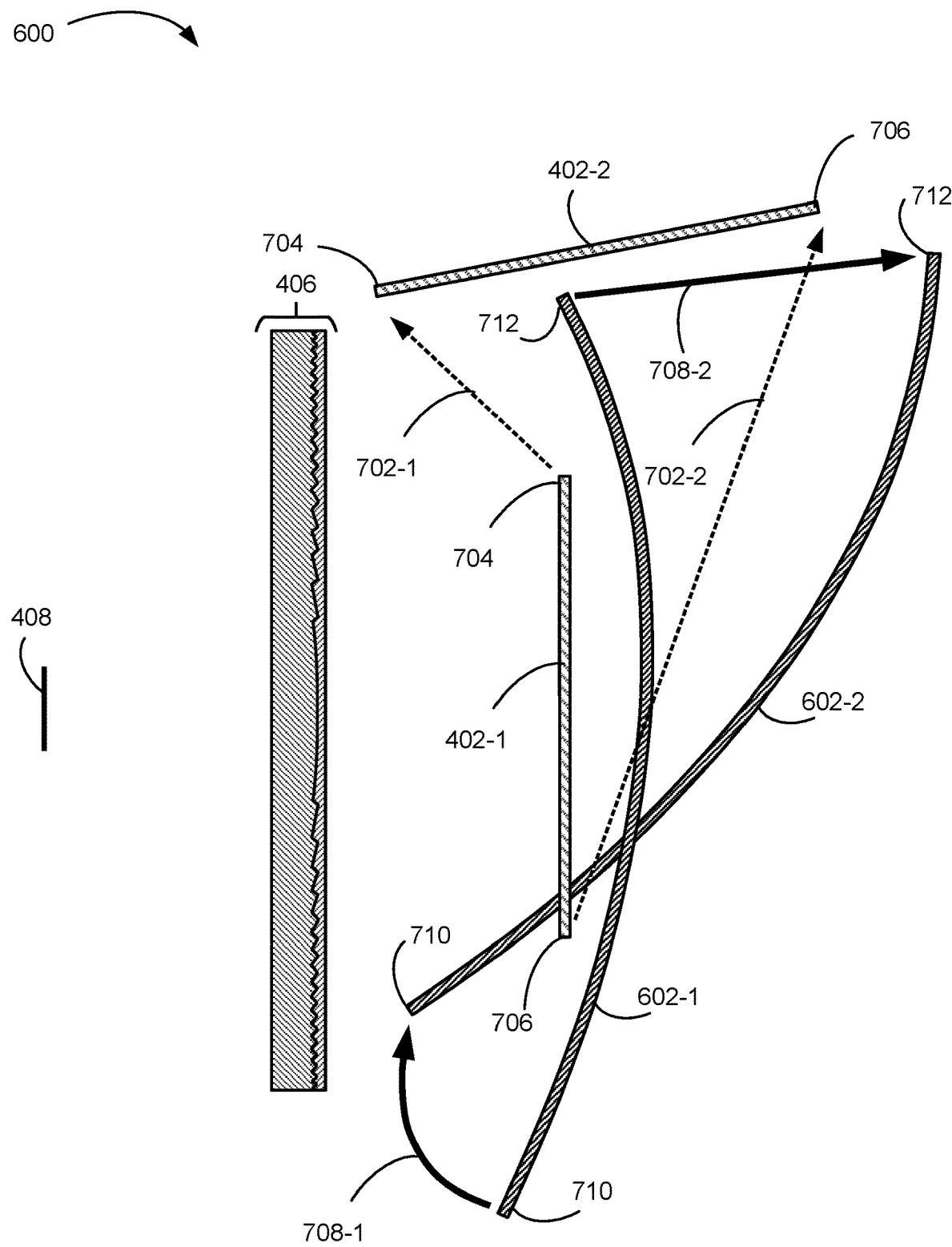

FIGS. 7A-7C are schematic diagrams illustrating transitions between the mixed reality and augmented reality modes in display device 600 of FIGS. 6A-6B in accordance with some embodiments. Specifically, FIGS. 7A-7C illustrate movements of display 402 and partial reflector 602 as they transition between their respective first positions and second positions. Arrow 702-1 indicates movement of first end portion 704 of display 402 and arrow 702-2 indicates movement of second end portion 706 of display 402. Likewise, arrow 708-1 indicates movement of first end portion 710 of partial reflector 602 and arrow 708-2 indicates movement of second end portion 712 of partial reflector. As shown, display 402 is turned and lifted such that display 402-2 defines an angle with respect to optical assembly 406 (e.g., angle A shown in FIG. 5B). Additionally, display 402 is transitioned diagonally such that a distance between first end portion 704 and optical assembly 406 is shorter when display 402 is in the second position than in the first position. Partial reflector 602 is transitioned such that a distance between first end portion 710 and optical assembly 406 is shorter in the second position than in the first position and a distance between second end portion 712 of partial reflector 602 and optical assembly is longer in the second position than in the first position.

Figure 7D:
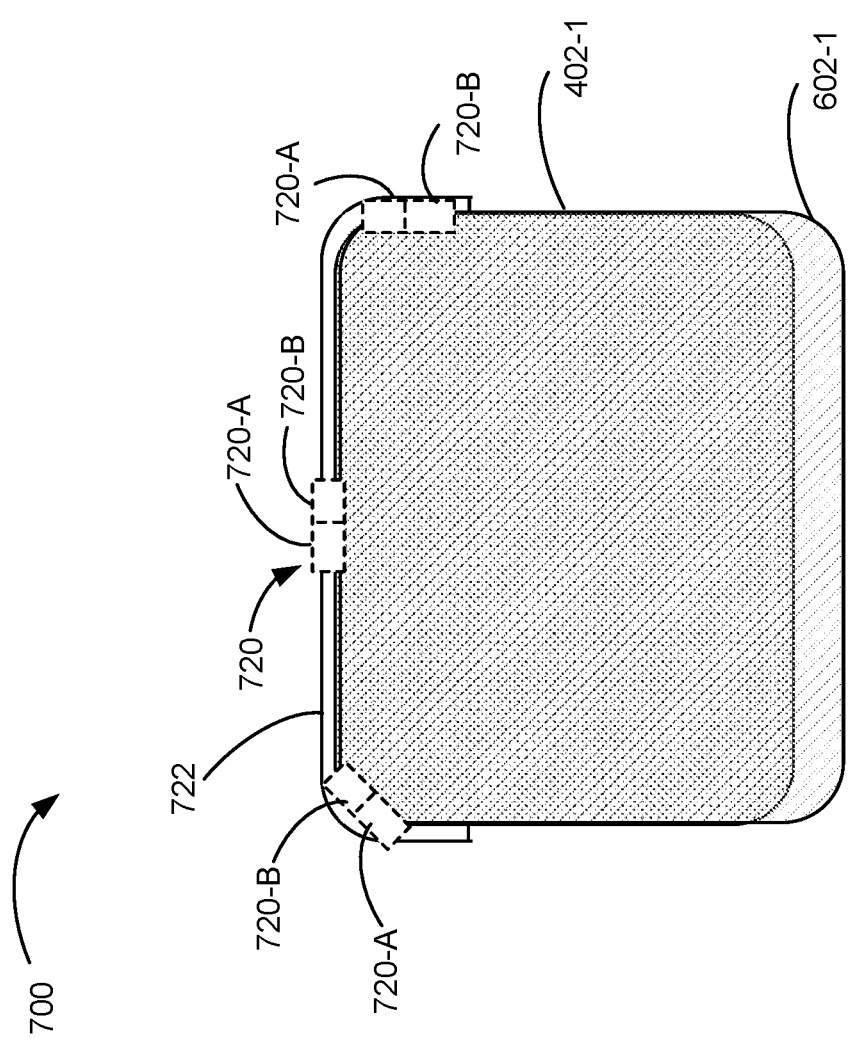
FIGS. 7D-7J are schematic diagrams illustrating a display device operable in a mixed reality mode and an augmented reality mode in accordance with some embodiments.

FIGS. 7D-7J are schematic diagrams illustrating display device 700 operable in a mixed reality mode and an augmented reality mode in accordance with some embodiments. Display device 700 corresponds to display device 600 described with respect to FIGS. 6A-6B, except that display device 700 further includes frame 722, display-moving assembly 720-A, and partial reflector-moving assembly 720-B, as shown in FIG. 7D. In some embodiments, frame 722 corresponds to frame 120 described with respect to FIG. 1. FIG. 7D illustrates a front view of display device 700. In FIG. 7D, display 402 is in the first position indicated as display 402-1 and partial reflector 602 in is the first position indicated as display 402-1 (i.e., in the mixed reality mode).

Display-moving assembly 720-A is connected to frame 722 and display 402. Display-moving assembly 720-A is configured to move display 402 between multiple different positions, including the first position and the second position illustrated in FIGS. 6A-6B. Partial reflector-moving assembly 720-B is connected to frame 722 and partial reflector 602. Partial reflector-moving assembly 720-B is configured to move partial reflector 602 between multiple different positions, including the first position and the second position illustrated in FIGS. 6A-6B. FIG. 7D shows three different positions for display-moving assembly 720-A and partial reflector-moving assembly 720-B. For example, display-moving assembly 720-A and partial reflector-moving assembly 720-B are positioned on a top portion, on a side portion, or in a corner portion of frame 722. In some embodiments, display-moving assembly 720-A and partial reflector-moving assembly 720-B are adjacent to each other. In some embodiments, display-moving assembly 720-A and partial reflector-moving assembly 720-B form a single uniform assembly (e.g., element-moving assembly 720).

Figure 7E:
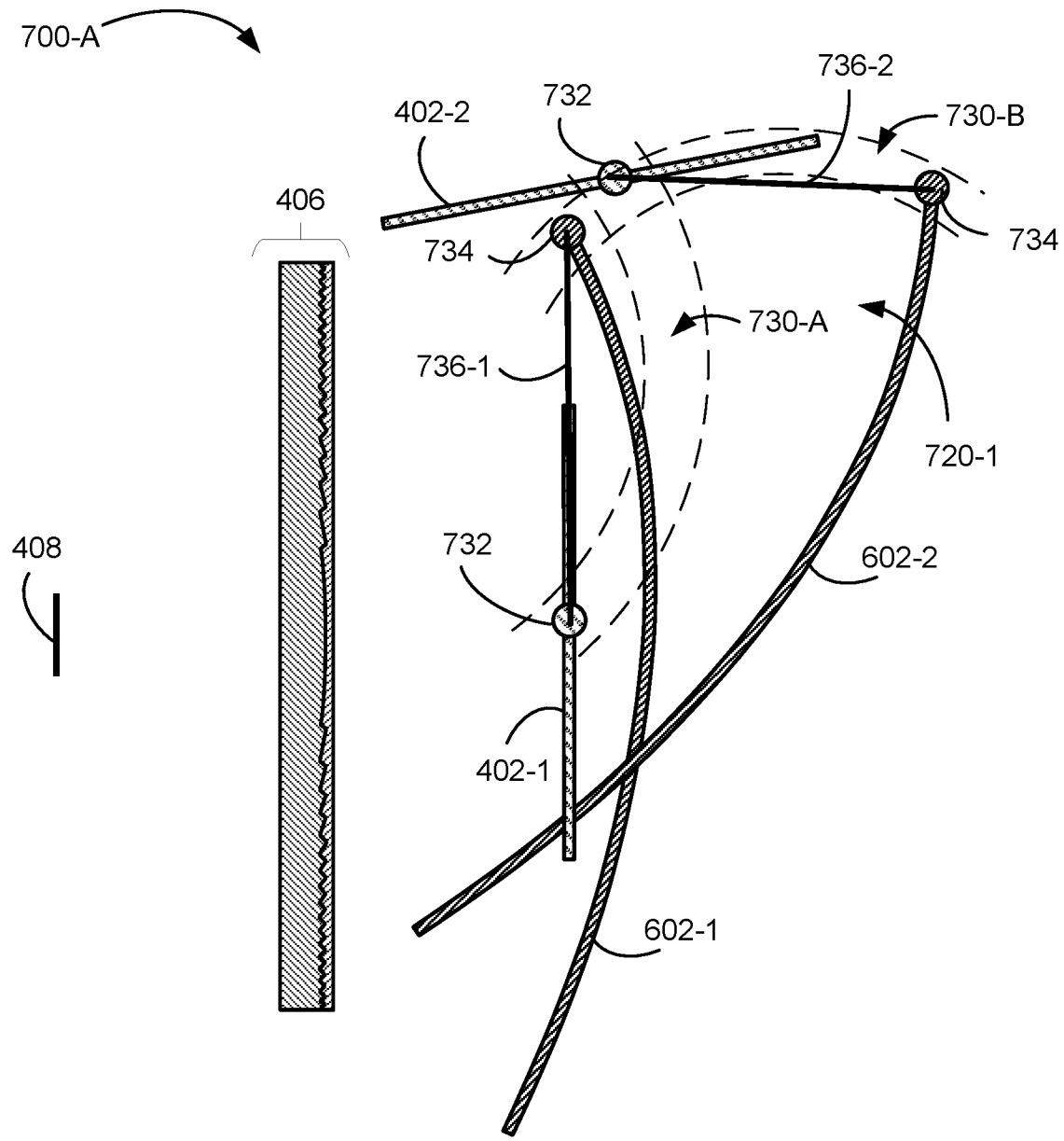
Figure 7G:
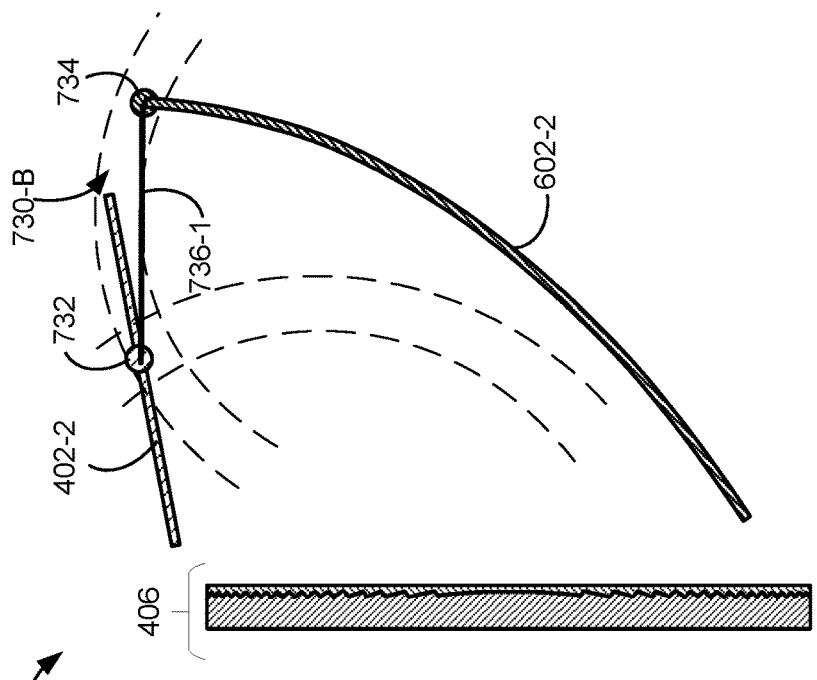
Figure 7F:
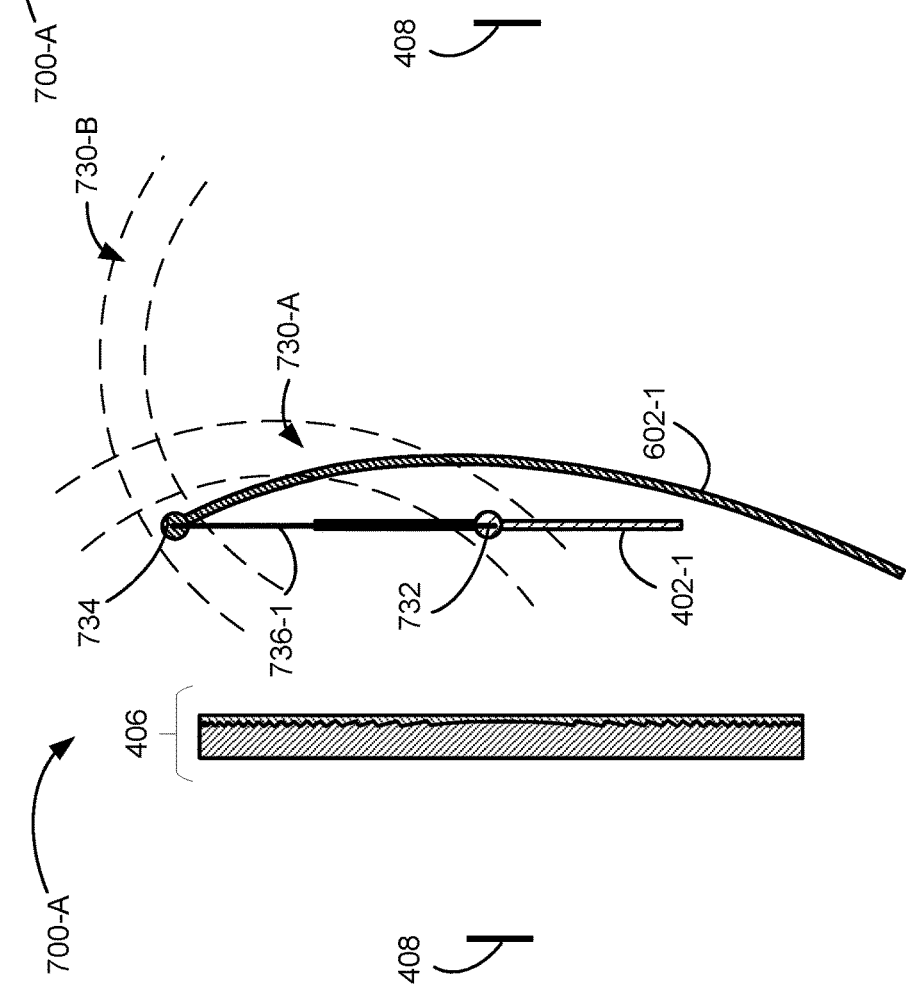

Display-moving assembly 720-A and partial reflector-moving assembly 720-B include mechanisms for moving display 402 and partial reflector 602. FIGS. 7E-7G illustrate display device 700-A including display device 600 connected to element-moving assembly 720-1. In some embodiments, element moving assembly 720-1 includes track 730-A, track 730-B, and arm 736. FIG. 7E shows an overlapping illustration of display 402 and partial reflector 602 of display device 600 moving between the mixed reality mode (e.g., first positions) and the augmented reality mode (e.g., the second positions) described with respect to FIGS. 6A and 6B. FIG. 7F illustrates display device 700-A in the mixed reality mode and FIG. 7G illustrates display device 700-A in the augmented reality mode.

As shown in FIG. 7E, element-moving assembly 720-1 may include track 730-A connected to display 402 with connector 732 and track 730-A connected to partial reflector 602 with connector 734. Connector 732 and connector 734 are each connected to opposite end portions of arm 736 such that a first end portion of arm 736 is connected to connector 732 and a second end portion of arm 736 is connected to connector 734. Arm 736 is configured to move between a first position (indicated as arm 736-1) and a second position (indicated as arm 436-2) such that connectors 732 and 734 move concurrently between the first and the second positions.

In some embodiments, the first end portion of arm 736 is configured to slide along track 730-A (e.g., first end portion of arm 736 is slidably connected to track 730-A with connector 732). Likewise, the second end portion of arm 736 is configured to slide along track 730-B (e.g., second end portion of arm 736 is slidably connected to track 730-B with connector 734). In some embodiments, tracks 730-A and 730-B are pin hinge tracks with virtual pivot points. In some embodiments, the movement of arm 736 is driven by a cam or a four-bar mechanism. In some embodiments, arm 736 is further connected to one or more springs to enable movement of arm 736. In some embodiments, arm 736 is connected to one or more spring-loaded tabs or one or more detents that engage and lock arm 736 in a first position and in a second position, such that positions of display 402 and partial reflector 602 are secured repeatedly as they move between their respective first positions and the second positions.

In FIG. 7E, element-moving assembly 720 includes a single arm (e.g., arm 736) for moving display 402 and partial reflector 602. In some embodiments, element-moving assembly 720 includes two arms and separate mechanisms for driving each arm (e.g., element-moving assembly 720 includes display-moving assembly 720-A and partial reflector-moving assembly 720-B shown in FIG. 7D).

Figure 7I:
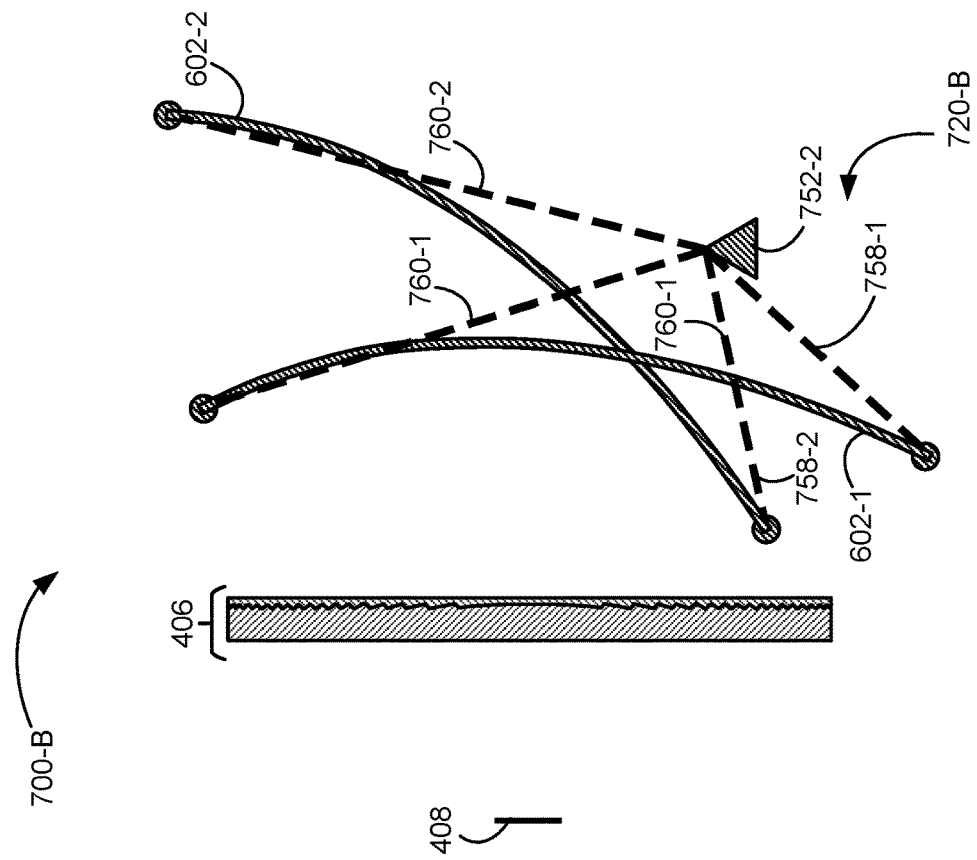
Figure 7H:
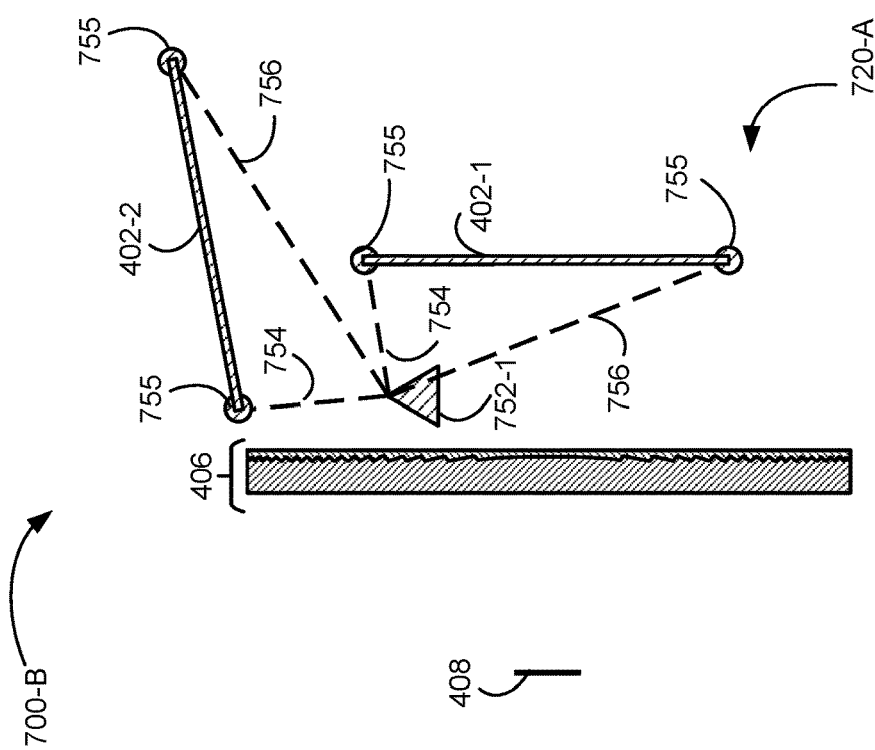

FIG. 7H illustrates display device 700-B including display device 600 connected to display-moving assembly 720-A. In the illustrated embodiment, display-moving assembly 720-A includes display hinge 752-1, first display linkage 754, and second display linkage 756. First display linkage 754 and second display linkage 756 are elongated components having opposing end portions. In some embodiments, first display linkage 754 and second display linkage 756 include two or more connectors (e.g., connectors 755) configured to couple the linkages to display 402. First end portion of linkage 754 is connected to display hinge 752-1 and a second end portion of linkage 754 is connected to a first end portion of display 402. Display hinge 752-1 is configured to rotate (pivot, turn) to move display 402 from the first position to the second position. In some embodiments, display hinge 752-1 is configured to move display 402 between the first position and the second position by rotating at least 75 degrees (e.g., at least 75, at least 80, at least 85, at least 90, at least 95, or at least 100 degrees).

FIG. 7I illustrates display device 700-B including display device 600 connected to partial reflector-moving assembly 720-B. Partial reflector-moving assembly 720-B includes partial reflector hinge 752-2, additional partial reflector linkage 758, and second partial reflector linkage 760. Additional partial reflector linkage 758 and second partial reflector linkage 760 are also elongated components having opposing end portions. In some embodiments, additional partial reflector linkage 758 and second partial reflector linkage 760 include two or more connectors (e.g., connectors 755) configured to connect the linkages to partial reflector 602. First end portion of partial reflector linkage 758 is connected to partial reflector hinge 752-2 and a second end portion of partial reflector hinge 758 is connected to a first end portion of partial reflector 602. Partial reflector hinge 752-2 is configured to rotate or turn to move partial reflector 602 from the first position to the second position. In some embodiments, partial reflector hinge 752-2 is configured to move partial reflector 602 between the first position and the second position by rotating at least 10 degrees (e.g., at least 10, at least 15, at least 20, at least 25, at least 30, at least 35, or at least 40 degrees).

Figure 7J:
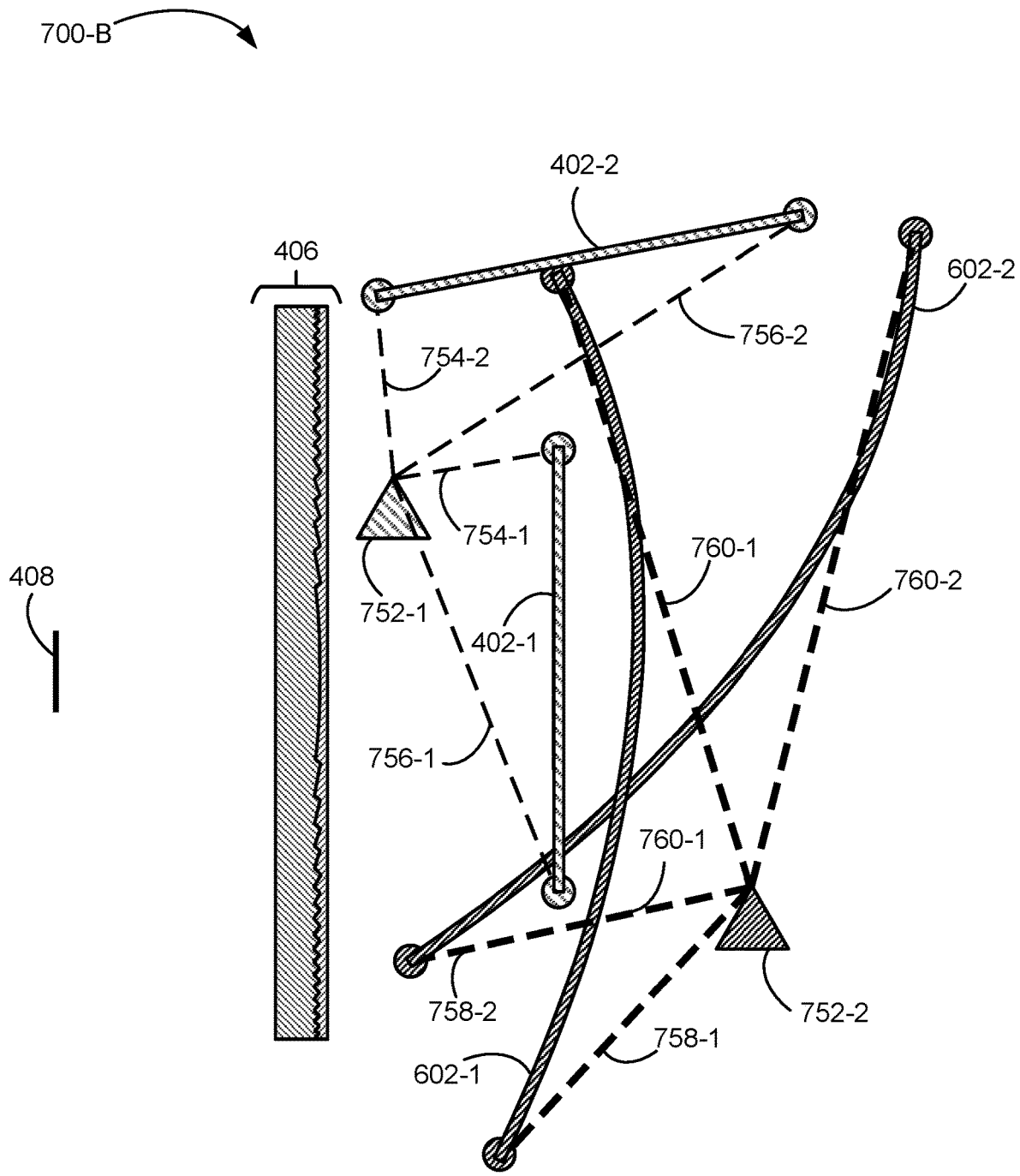

FIG. 7J illustrates display device 700-B including display device 600 connected to display-moving assembly 720-A and partial reflector-moving assembly 720-B. As shown, display device 700-B is configured to move display 402 and partial reflector 602 between their respective first and second positions concurrently. In some embodiments, display hinge 752-1 and partial reflector hinge 752-2 are connected to frame 722 shown in FIG. 7D, and display 402 and partial reflector 602 move with respect to frame 722.

In light of these principles, we now turn to certain embodiments of the disclosure.

In accordance with some embodiments, a display device includes a frame (e.g., frame 722 in FIG. 7D), a display (e.g., display 402 in FIG. 6A), an optical assembly (e.g., optical assembly 406 in FIG. 6A), and a display-moving assembly (e.g., display-moving assembly 720-A in FIG. 7D) connected to the display and the frame. The display-moving assembly is configured to move the display between multiple positions, including a first position and a second position (e.g., display 402-1 in FIG. 6A and display 402-2 in FIG. 6B). When the display is in the first position, the display is configured to output image light in a first direction (e.g., image light 404 in FIG. 6A). The first direction is substantially parallel to an optical axis of the optical assembly (e.g., optical axis 407 in FIG. 6A). When the display is in the second position, the display is positioned away from the optical axis of the optical assembly (e.g., display 402-2 in FIG. 6B).

In some embodiments, the display and the optical assembly define an angle that is at least 75 degrees when the display is in the second position (e.g., at least 75, at least 80, at least 85, at least 90, at least 95, or at least 100 degrees) (e.g., angle A in FIG. 6B). In some embodiments, the display and the optical assembly define an angle that is at least 90 degrees.

In some embodiments, the optical assembly has a first region and a second region (e.g., first region 406-A and second region 406-B in FIGS. 4B-4C). When the display is in the first position, the first region of the optical assembly is configured to receive the image light (e.g., image light 404 including rays 404-1 and 404-2) output by the display and transmit the image light toward a reference pupil (e.g., reference pupil 408 corresponding to an eye of a user of display device 400) and the second region of the optical assembly is configured to receive ambient light (e.g., ambient light 410 including rays 410-1 and 410-2) from outside of the display device and transmit the ambient light toward the reference pupil. When the display is in the second position, the first region and the second region of the optical assembly are configured to receive the ambient light and transmit the ambient light toward the reference pupil (e.g., FIG. 5B). In some embodiments, the second region corresponds to a peripheral region of the display. In some embodiments, the first region has a larger size than the second region. In some embodiments, the first region corresponds to an upper region and the second region corresponds to a lower region of the optical assembly.

In some embodiments, the display device is configured to allow additional ambient light (e.g., rays 410-3 in FIG. 4A) to enter the reference pupil without being transmitted through the optical assembly.

In some embodiments, when the display is in the first position, the optical assembly is further configured to receive, by a third region overlapping the first region and the second region (e.g., third region 406-C), both the image light output by display and the ambient light. The image light output by the display corresponds to one or more images. The ambient light corresponds to light from outside the display device. The third region of the optical assembly is configured to combine the image light and the ambient light such that the one or more images of the image light are perceived by a user together with the ambient light. In this way, for example, the user of the display device is can view mixed reality content.

In some embodiments, the display device further includes a partial reflector and a partial reflector-moving assembly (e.g., partial reflector 602 and partial reflector-moving assembly 720-B in FIG. 7D) connected to the partial reflector and the frame (e.g., frame 722). The partial reflector-moving assembly is configured to move the partial reflector between multiple positions, including a third position and a fourth position (e.g., partial reflector 602-1 in FIG. 6A and partial reflector 602-2 in FIG. 6B). When the partial reflector is in the third position, the display is in the first position and the display is disposed between the optical assembly and the partial reflector (e.g., FIG. 6A). When the partial reflector is in the fourth position, the display is in the second position (e.g., FIG. 6B). In some instances, when the display is in the first position, the displayed device is said to be in a mixed reality mode, while the displayed device is said to be in an augmented reality mode when the display is in the second position.

In some embodiments, the display has an emitting surface (e.g., surface 402-A in FIG. 6A) and a non-emitting surface (e.g., opaque surface 402-B) opposite to the emitting surface. When the display is in the first position, the optical assembly faces the emitting surface of the display and the partial reflector faces the non-emitting surface (e.g., FIG. 6A). When the display is in the second position, the partial reflector in the fourth position is disposed non-parallel to the optical assembly and the display (e.g., FIG. 6B). The display is then at least partially facing the emitting surface of the display such that the partial reflector is configured to receive the image light (e.g., rays 404-1 and 404-2) output by the display and redirect at least a portion of the image light, through the optical assembly, to the reference pupil.

In some embodiments, the display-moving assembly includes a hinge, a first linkage, and a second linkage (e.g., display hinge 752-1, first display linkage 754, and second display linkage 756 in FIG. 7H). The first linkage has opposing first and second ends that are connected (i) at the first end to a first end portion of the display and (ii) at the second end to the hinge. The second linkage has opposing third and fourth ends that are connected (i) at the third end to a second end portion of the display and (ii) at the second end to the hinge. The hinge is configured to rotate to move the display between the first position and the second position. In some embodiments, moving the position of the display between the first position and the second position includes rotating the hinge at least 75 degrees (e.g., at least 75, at least 80, at least 85, at least 90, at least 95, or at least 100 degrees).

In some embodiments, the partial reflector-moving assembly includes a hinge, a third linkage, and a fourth linkage (e.g., partial reflector hinge 452-2, additional partial reflector linkage 758, and second partial reflector linkage 760 in FIG. 7I). The third linkage has opposing fifth and sixth ends that are connected (i) at the fifth end to a first end portion of the partial reflector and (ii) at the sixth end to the hinge. The fourth linkage has opposing seventh and eighth ends that are connected (i) at the seventh end to a second end portion of the partial reflector and (ii) at the eighth end to the hinge. The hinge is configured to rotate to move the partial reflector between the third position and the fourth position. In some embodiments, moving the position of the partial reflector between the third position and the fourth position includes rotating the hinge at least 10 degrees (e.g., at least 10, at least 15, at least 20, at least 25, at least 30, at least 35, or at least 40 degrees).

In some embodiments, the display-moving assembly is configured to move the display concurrently with the partial reflector-moving assembly moving the partial reflector (e.g., FIG. 7J))

In some embodiments, the hinge and the hinge are configured to rotate concurrently (e.g., FIG. 7J). In some embodiments, the display-moving assembly and the partial reflector-moving assembly are coupled to each other. In some embodiments, the display-moving assembly and the partial reflector-moving assembly form a uniform assembly (e.g., element-moving assembly 720 in FIG. 7D).

In some embodiments, the display-moving assembly includes a first arm having an end portion connected to the display and a first track (e.g., arm 736 connected to track 730-A in FIG. 7E), wherein the end portion of the first arm is slidably connected to the first track (e.g., by connector 732). Wherein the first arm is configured to move the display between the first position and the second position by moving the end portion of the first arm along the first track.

In some embodiment, the partial reflector-moving assembly includes a second arm having an end portion connected to the partial reflector and a second track (e.g., arm 736 connected to track 730-B in FIG. 7E), wherein the end portion of the second arm is slidably connected to the second track (e.g., by connector 734). The second arm is configured to move the partial reflector between the third position and the fourth position by moving the end portion of the second arm along the second track.

In some embodiments, the first arm and the second arm are coupled to form a joined arm such that the end portion of the first arm and the end portion of the second arm form opposing end portions of the joined arm (e.g., arm 736). The joined arm is configured to move the position of the display and the position of the partial reflector concurrently.

In some embodiments, when the partial reflector is in the third position, the partial reflector is further configured to receive ambient light (e.g., ambient light 410 including rays 410-1 and 410-2 in FIG. 6A) and transmit at least a portion of the ambient light through the second region of the optical assembly to the reference pupil. When the partial reflector is in the fourth position, the partial reflector is further configured to receive the ambient light and transmit at least a portion of the ambient light, through the first region and the second region of the optical assembly (e.g., ambient light 410 including rays 410-1, 410-2, and 410-3), toward the reference pupil.

In some embodiments, the partial reflector has a curved shape and, when the partial reflector is in the fourth position (e.g., partial reflector 602-2 in FIG. 6B), the partial reflector is further configured to focus the image light output by the display.

In some embodiments, the image light has a first circular polarization and the optical assembly includes an additional partial reflector (e.g., partial reflector 406-1 in FIGS. 6C-6D), a retarder plate (e.g., retarder plate 406-2), and a reflective polarizer (e.g., reflective polarizer 406-3). The retarder plate is disposed between the additional partial reflector and the reflective polarizer. When the display is in the first position, the image light having the first circular polarization is received from the display by the optical assembly and transmitted through the optical assembly via a first optical path. The first optical path includes reflection at the reflective polarizer and the additional partial reflector. When the display is in the second position, the image light having the first circular polarization is received from the display by the partial reflector and redirected as image light having second circular polarization distinct from the first circular polarization. The image light having the second circular polarization is received by the optical assembly and transmitted through the optical assembly via a second optical path. The second optical path includes transmission through the reflective polarizer and the additional partial reflector. For example, the optical assembly is a pancake lens that provides either a folded or un-folded optical path, depending on the polarization of light. In some embodiments, the optical assembly further includes an anti-reflection coating and/or an additional retarder (e.g., retarder plate 406-4) surface optically coupled with the reflective polarizer (e.g., the anti-reflection coating and/or the additional retarder surface is disposed between the reflective polarizer and the reference pupil).

In some embodiments, the partial reflector includes a retarder surface (e.g., surface 602-A in FIGS. 6C-6D) configured to change the polarization of the ambient light to be the second circular polarization. When the display is in the first position, the optical assembly is further configured to receive the ambient light and transmit at least a portion of the ambient light, through the second region of the optical assembly, via the second optical path, to the reference pupil. When the display is in the second position, the optical assembly is further configured to receive the ambient light and transmit at least a portion of the ambient light through the first region and the second region of the optical assembly via the second optical path to the reference pupil.

In some embodiments, the display device is a head-mounted display device (e.g., display device 100 in FIG. 1).

In accordance with some embodiments, a method (e.g., FIGS. 5A-5B) performed at a display device including a display, an optical assembly and a display-moving assembly include moving, with the display-moving assembly connected to the display and the frame, the display to a first position. In response to moving the display to the first position, outputting, by the display, image light in a first direction. The first direction is substantially parallel to an optical axis of the optical assembly. The method also includes moving, with the display-moving assembly connected to the display and the frame, the display from the first position to a second position different from the first position. The display is positioned away from the optical axis of the optical assembly when in the second position.

In some embodiments, the display device (e.g., FIGS. 6A-6B) further includes a partial reflector and a partial reflector-moving assembly connected to the partial reflector and the frame. Moving the display from the first position to the second position causes the partial reflector to move from a third position to a fourth position.

In some embodiments, moving the display to the second position includes moving the display so that the display and the optical assembly define an angle that is at least 75 degrees (e.g., FIG. 5B).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
   a frame;
   a display;
   an optical assembly; and
   a display-moving assembly connected to the display and the frame, the display-moving assembly configured to move the display between multiple different positions, including a first position and a second position, wherein:
   (i) when in the first position, the display is configured to output image light in a first direction, the first direction substantially parallel to an optical axis of the optical assembly; and
   (ii) when in the second position, the display is positioned away from the optical axis of the optical assembly so that the display does not intersect with the optical axis of the optical assembly, wherein:
   the optical assembly has a first region and a second region;
   when the display is in the first position:
      the first region of the optical assembly is configured to receive the image light output by the display and transmit the image light toward a reference pupil, and
      the second region of the optical assembly is configured to receive ambient light from an outside of the display device and transmit the ambient light toward the reference pupil; and
   when the display is in the second position the first region and the second region of the optical assembly are configured to receive the ambient light and transmit the ambient light toward the reference pupil.

2. The display device of claim 1, wherein, when the display is in the second position, the display and the optical assembly define an angle that is at least 75 degrees.

3. The display device of claim 1, wherein the display-moving assembly includes:
   a hinge;
   a first linkage, having opposing first and second ends, connected (i) at the first end to a first end portion of the display and (ii) at the second end to the hinge; and
   a second linkage, having opposing third and fourth ends, connected (i) at the third end to a second end portion of the display and (ii) at the fourth end to the hinge,
   wherein:
   the hinge is configured to move the display between the first position and the second position.

4. The display device of claim 3, wherein the hinge is configured to move the display between the first position and the second position by rotating the hinge at least 75 degrees.

5. The display device of claim 1, wherein:
   the optical assembly is further configured to receive, when the display is in the first position, by a third region overlapping the first region and the second region, the image light output by display and the ambient light;
   the image light output by the display corresponds to one or more images;
   the ambient light corresponds to light from the outside the display device; and
   the third region of the optical assembly is configured to combine the image light and the ambient light such that the one or more images of the image light are perceived by a user together with the ambient light.

6. The display device of claim 1 further comprising:
   a partial reflector; and
   a partial reflector-moving assembly connected to the partial reflector and the frame, the partial reflector-moving assembly configured to move the partial reflector between multiple different positions, including a third position and a fourth position, wherein:
when the partial reflector is in the third position, the display is in the first position and the display is disposed between the optical assembly and the partial reflector; and
when the partial reflector is in the fourth position, the display is in the second position.

7. The display device of claim 6, wherein:
the display has an emitting surface and a non-emitting surface opposite to the emitting surface;
when the display is in the first position, the optical assembly faces the emitting surface of the display and the partial reflector faces the non-emitting surface; and
when the display is in the second position, the partial reflector in the fourth position (i) is disposed non-parallel to the optical assembly and the display and (ii) is at least partially facing the emitting surface of the display such that the partial reflector is configured to receive the image light output by the display and redirect at least a portion of the image light, through the optical assembly, to the reference pupil.

8. The display device of claim 6, wherein the partial reflector-moving assembly includes:
a hinge; and
a third linkage, having opposing fifth and sixth ends, connected (i) at the fifth end to a first end portion of the partial reflector and (ii) at the sixth end to the hinge; and
a fourth linkage, having opposing seventh and eighth ends, connected (i) at the seventh end to a second end portion of the partial reflector and (ii) at the eighth end to the hinge,
wherein:
the hinge is configured to move the partial reflector between the third position and the fourth position.

9. The display device of claim 6, wherein the display-moving assembly is configured to move the display concurrently with the partial reflector-moving assembly moving the partial reflector.

10. The display device of claim 6, wherein the display-moving assembly includes:
a first arm having an end portion connected to the display; and
a first track, wherein the end portion of the first arm is slidably connected to the first track, wherein:
the first arm is configured to move the display between the first position and the second position by moving the end portion of the first arm along the first track.

11. The display device of claim 10, wherein the partial reflector-moving assembly includes:
a second arm having an end portion connected to the partial reflector; and
a second track, wherein the end portion of the second arm is slidably connected to the second track, wherein:
the second arm is configured to move the partial reflector between the third position and the fourth position by moving the end portion of the second arm along the second track.

12. The display device of claim 11, wherein the first arm and the second arm are coupled to form a joined arm such that the end portion of the first arm and the end portion of the second arm form opposing end portions of the joined arm, and the joined arm is configured to move the position of the display and the position of the partial reflector concurrently.

13. The display device of claim 6, wherein the partial reflector is further configured to:
when the partial reflector is in the third position, receive ambient light and transmit at least a portion of the ambient light, through the second region of the optical assembly, to the reference pupil; and
when the partial reflector is in the fourth position, receive the ambient light and transmit at least a portion of the ambient light, through the first region and the second region of the optical assembly, toward the reference pupil.

14. The display device of claim 6, wherein:
the partial reflector has a curved shape; and
the partial reflector is further configured to, when the partial reflector is in the fourth position, focus the image light output by the display.

15. The display device of claim 6, wherein:
the image light has first circular polarization;
the optical assembly includes an additional partial reflector, a retarder plate, and a reflective polarizer, the retarder plate disposed between the additional partial reflector and the reflective polarizer;
when the display is in the first position:
the image light having the first circular polarization from the display is received by the optical assembly and transmitted through the optical assembly via a first optical path that includes reflection at the reflective polarizer and the additional partial reflector;
when the display is in the second position:
the image light from the display is received by the partial reflector and redirected as image light having second circular polarization distinct from the first circular polarization; and
the image light having the second circular polarization is received by the optical assembly and transmitted through the optical assembly via a second optical path that includes transmission through the reflective polarizer and the additional partial reflector.

16. The display device of claim 15, wherein:
the partial reflector includes a retarder surface configured to change polarization of the ambient light to be the second circular polarization, and
the optical assembly is further configured to:
when the display is in the first position, receive the ambient light and transmit at least a portion of the ambient light, through the second region of the optical assembly, via the second optical path, to the reference pupil; and
when the display is in the second position, receive the ambient light and transmit at least a portion of the ambient light, through the first region and the second region of the optical assembly, via the second optical path, to the reference pupil.

17. A method performed at a display device including a frame, a display, an optical assembly and a display-moving assembly, comprising:
moving, with the display-moving assembly connected to the display and the frame, the display to a first position;
in response to moving the display to the first position, outputting, by the display, image light in a first direction, the first direction substantially parallel to an optical axis of the optical assembly; and
moving, with the display-moving assembly connected to the display and the frame, the display from the first position to a second position different from the first position, wherein the display is positioned away from the optical axis of the optical assembly when in the second position so that the display does not intersect with the optical axis of the optical assembly, and wherein:
the optical assembly has a first region and a second region;
the method includes:
when the display is in the first position:
receiving, with the first region of the optical assembly, the image light output by the display and transmit the image light toward a reference pupil, and
receiving, with the second region of the optical assembly, ambient light from an outside of the display device and transmitting the ambient light toward the reference pupil; and
when the display is in the second position, receiving, with the first region and the second region of the optical assembly, the ambient light and transmitting the ambient light toward the reference pupil.

18. The method of claim 17, wherein:
the display device further includes a partial reflector and a partial reflector-moving assembly connected to the partial reflector and the frame, and
moving the display from the first position to the second position causes the partial reflector to move from a third position to a fourth position.

19. The method of claim 17, wherein:
moving the display to the second position includes moving the display so that the display and the optical assembly define an angle that is at least 75 degrees.

* * * * *